US007802673B2

(12) United States Patent
Yasuda et al.

(10) Patent No.: US 7,802,673 B2
(45) Date of Patent: Sep. 28, 2010

(54) IMAGE RECORDING APPARATUS

(75) Inventors: Mamoru Yasuda, Tokyo (JP); Makoto Shibano, Tokyo (JP)

(73) Assignee: Olympus Corporation, Tokyo (JP)

( * ) Notice: Subject to any disclaimer, the term of this patent is extended or adjusted under 35 U.S.C. 154(b) by 414 days.

(21) Appl. No.: 11/895,768

(22) Filed: Aug. 27, 2007

(65) Prior Publication Data

US 2008/0053793 A1 Mar. 6, 2008

(30) Foreign Application Priority Data

Aug. 30, 2006 (JP) ............................ 2006-233094
Jun. 21, 2007 (JP) ............................ 2007-164190

(51) Int. Cl.
*B65G 15/00* (2006.01)
*G03G 15/01* (2006.01)

(52) U.S. Cl. ........................ 198/813; 198/582; 399/299

(58) Field of Classification Search ................. 198/582; 399/299, 306, 303
See application file for complete search history.

(56) References Cited

U.S. PATENT DOCUMENTS 6,463,247 B1 * 10/2002 Kawano et al. ............. 399/299

FOREIGN PATENT DOCUMENTS

JP 11-268843 A 10/1999
JP 2004077868 A * 3/2004

* cited by examiner

*Primary Examiner*—Gene Crawford
*Assistant Examiner*—Kavel P Singh
(74) *Attorney, Agent, or Firm*—Fishauf, Holtz, Goodman & Chick, P.C.

(57) ABSTRACT

A conveying mechanism includes: a first belt roller; a second belt roller provided substantially parallel to the first belt roller downstream in the conveying direction of the recording medium; a conveying belt looped over at least the first belt roller and the second belt roller; a belt drive unit conveying the conveying belt; a resist roller pair configured by a first resist roller and a second resist roller contacting the first resist roller; and a resist roller drive unit driving the rotation of the first resist roller or the second resist roller. The first belt roller and the first resist roller are coaxially arranged, and the first belt roller rotates independent of the first resist roller.

13 Claims, 23 Drawing Sheets

IMAGE RECORDING APPARATUS

CROSS REFERENCE TO RELATED APPLICATION

This application claims priority from Japanese Patent Application Nos. JP2006-233094 filed on Aug. 30, 2006 and JP2007-164190 filed on Jun. 21, 2007, which is incorporated hereinto by reference.

BACKGROUND OF THE INVENTION

1. Field of the Invention

The present invention relates to an image recording apparatus such as a copying machine, a printer, etc., and more specifically to an image recording apparatus having a conveying mechanism for conveying a recording medium such as cutting sheets of paper etc.

2. Description of the Related Art

Generally, an image recording apparatus such as an ink jet printer etc. conveys a recording medium supplied from a recording medium storage unit such as a paper feed cassette etc. to an image recording unit, and performs a recording process (records data). The conveying posture (skew) of a conveyed recording medium is corrected immediately before it is conveyed to the image recording unit.

If the recording medium obliquely travels and is conveyed to the image recording unit, record data is obliquely recorded on the recording medium. Additionally, in a color recording process, color displacements etc. occur. Thus, if the recording medium obliquely travels when it is conveyed, the quality of an image is degraded.

As a technique to solve the above-mentioned problem, for example, a patent document (Japanese Published Patent Application No. H11-268843) discloses the configuration of a sheet conveying device which includes a first conveying device, a second conveying device for conveying a sheet conveyed by the first conveying device and further conveyed downstream, and is capable of adjusting the angle made by the conveying direction by the first conveying device and the conveying direction by the second conveying device.

The sheet conveying device described in the patent document is realized by including an adjustment mechanism for allowing the direction of a resist roller to coincide with the travel direction of a transfer belt sliding on an image bearing member in the image recording unit.

The sheet conveying device according to the above-mentioned patent document includes the first conveying device configured by a movable side plate 155, a resist driving roller 153 supported for rotation on the movable side plate 155, a resist driven roller 154, a rack gear 156 provided for the movable side plate 155, a pinion gear 157 engaging with the rack gear 156, a stepping motor (M) 152 having the pinion gear 157 for a rotation shaft, and a microprocessor (MP) 151 for controlling the stepping motor (M) 152 as shown in FIG. 1.

The sheet conveying device according to the above-mentioned patent document further includes between the first conveying device and the second conveying device in the conveying path of a sheet P (recording medium): a touch plate 158 for touching the sheet P looped after fed by the first conveying device; two reflective sensors **159*f* and 159*r* that are provided separate from each other in the width direction of the sheet P downstream the touch plate 158, and detect the sheet P that loops at the height h. A detection signal of the reflective sensors 159*f* and 159*r* is configured to be processed by the microprocessor (MP) 151**.

Furthermore, the sheet conveying device according to the patent document has the second conveying device configured by a transfer belt 163, a pincer roller 162 for moving a sheet P placed on the transfer belt 163 to slide on an image bearing member 161 (only one of the four image bearing members are shown in FIG. 1); transfer belt rollers 164 and 165 (only two driven rollers are shown in FIG. 1) on which the transfer belt 163 is looped over as movable.

Thus, in the sheet conveying device with the above-mentioned configuration according to the above-mentioned patent document, the microprocessor (MP) 151 controls the stepping motor (M) 152 such that the difference α between the loop height hf of the sheet P detected by the reflective sensor **159*f* and the loop height hr of the sheet P detected by the reflective sensor 159*r* can be canceled. That is, the microprocessor (MP) 151** corrects the skew of the sheet P by performing control such that the conveying direction of the sheet P by the first conveying device can match the conveying direction of the sheet P by the second conveying device.

SUMMARY OF THE INVENTION

The image recording apparatus according to the main aspect of the present invention includes an image recording unit for recording an image on a recording medium, and a conveying mechanism for conveying the recording medium. The conveying mechanism includes: a first belt roller; a second belt roller provided substantially parallel to the first belt roller downstream in the conveying direction of the recording medium; a conveying belt looped over at least the first belt roller and the second belt roller; a belt drive unit for conveying the conveying belt; a resist roller pair configured by a first resist roller and a second resist roller contacting the first resist roller; and a resist roller drive unit for driving the rotation of the first resist roller or the second resist roller. The first belt roller and the first resist roller are coaxially arranged, and the first belt roller rotates independent of the first resist roller.

DESCRIPTION OF THE PREFERRED EMBODIMENTS

The modes for embodying the present invention are described below with reference to the attached drawings.

Figure 2:
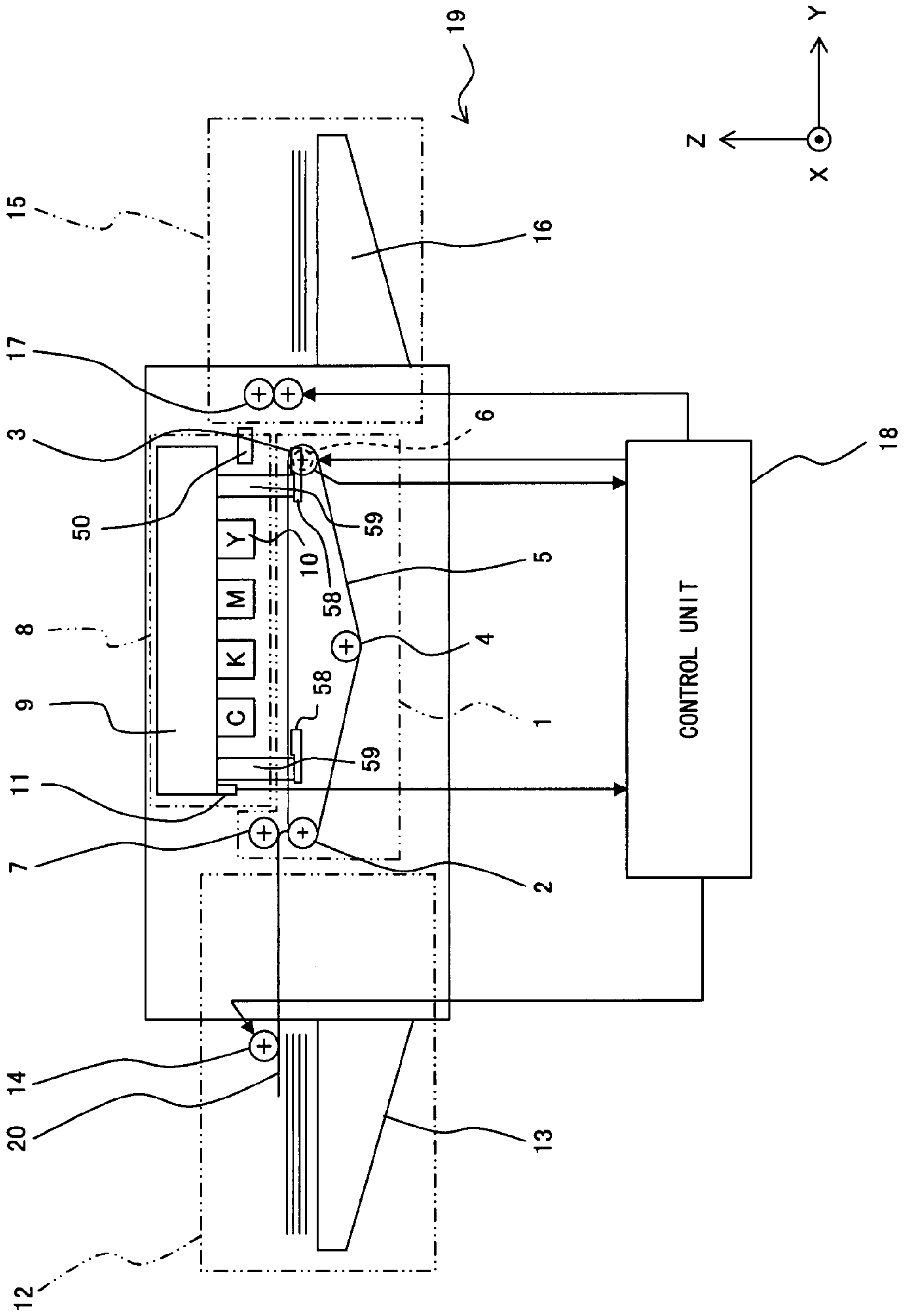
FIG. 2 is a schematic chart of an arrangement example of an image recording apparatus according to the present invention with a signal path by a control unit.

FIG. 2 is a schematic chart of an arrangement example of an image recording apparatus according to the present invention with a signal path by a control unit.

An image recording apparatus 19 includes at least: a conveying mechanism 1; an image recording unit 8 provided above and opposite the conveying mechanism 1; a feed unit 12 provided the most upstream of the conveying path of a recording medium 20 for conveying downstream a plurality of stored recording medium 20; an eject unit 15 for ejecting the recording medium 20 after a recording process performed by the image recording unit 8 and collecting them; a control unit 18 for integrally controlling each component of the image recording apparatus 19; and a maintenance unit 50 for maintaining a recording head.

The conveying mechanism 1 includes at least a driven roller 2, a driving roller 3 as a second belt roller, a tension roller 4, a conveying belt 5, a conveying information generation unit 6 provided on the rotation shaft of the driving roller 3; and a resist roller pair 7.

For example, a rotary encoder is used for the conveying information generation unit 6, and notifies the control unit 18 of a pulse signal generated by the conveyance (travel) of the conveying belt 5. The rotary encoder in the conveying information generation unit 6 can also be provided in the driven roller 2.

An example of the configuration of the conveying mechanism 1 is described later in detail.

The image recording unit 8 includes at least one recording head 10, a head holder 9, and a medium detection unit 11. The recording head 10 is informed of record data (1 through n lines where n (2≦n) indicates an integer) from the upper apparatus connected to the control unit 18 through, for example, a LAN etc. but not shown in the attached drawings. Based on the record data, ink is applied on the recording medium 20, and the recording process is performed. The head holder 9 suspends and holds the nozzle of the recording head 10 toward the conveying surface of the recording medium of the conveying belt 5. A touch pin 59 is also provided as described later.

The medium detection unit 11 detects the end portion of the recording medium 20 conveyed by the conveying mechanism 1.

The image recording unit 8 shown in FIG. 2 has four recording heads for cyan (C), black (K), magenta (M), and yellow (Y) arranged in this order from the upstream in the conveying direction of the recording medium 20. The recording head 10 has a nozzle string having a plurality of nozzles over the width of the recording medium 20.

The image recording unit 8 is not restricted by the number of recording heads 10 shown in FIG. 2 and the arranging order of each ink color.

The medium detection unit 11 can be, for example, a reflective sensor. The reflective sensor is attached to the head holder 9, and detects the end portion of the recording medium 20. A detection signal detected by the reflective sensor is transmitted to the control unit 18. The medium detection unit 11 is not limited to a reflective sensor, but can be any sensor capable of detecting the end portion of the recording medium 20, and can be provided for a component other than the head holder 9.

The feed unit 12 includes a supply tray 13 for stacking and storing a plurality of recording medium 20, and a pickup roller 14 for picking up piece by piece the top sheet of the stack of recording medium 20 and conveying it downstream.

The eject unit 15 includes an eject roller pair 17 for ejecting the recording medium 20 recorded by the image recording unit 8, and a paper eject tray 16 for stacking and storing the ejected recording medium 20.

The maintenance unit 50 is provided downstream in the direction of the recording medium, and maintains the recording head 10. The maintenance unit 50 has, for example, an ink pan, a blade, a cap, etc. corresponding to each color in the recording head 10. The maintenance unit 50 moves to the maintaining position to maintain the recording head 10 when the conveying mechanism 1 is set in the saved state by an up-and-down mechanism described later.

The control unit 18 controls each component of the entire image recording apparatus 19 including the conveying mechanism 1. The control unit 18 has the configuration of at least a processing circuit including, for example, an MPU (microprocessor unit) having a control function and an arithmetic function, ROM (read only memory) storing a control program, RAM (random access memory) as work memory of the MPU, etc., and nonvolatile memory storing a set value etc. relating to the control of the image recording apparatus 19.

Two contact blocks 58 for each of the paper supply side and the paper eject side respectively before and after a platen frame described later, that is, a total of four contact blocks 58, are provided. The contact blocks 58 contact the touch pins 59 extending from the head holder 9. The touch pin 59 has steps at the end portion.

Figure 3:
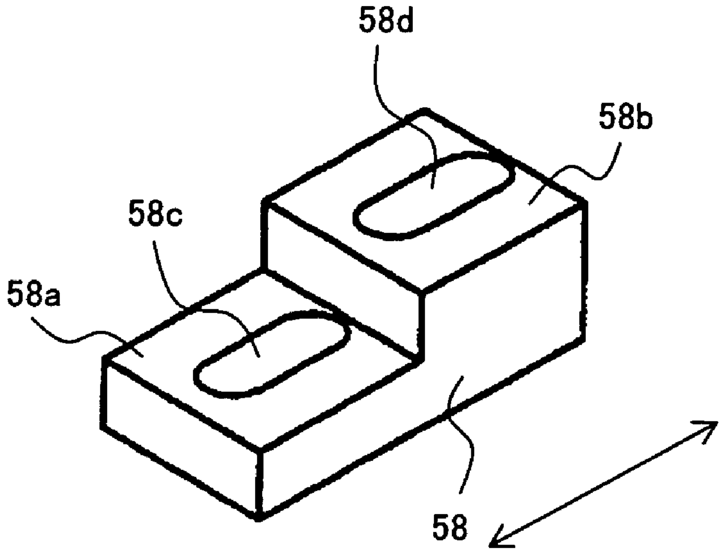
FIG. 3 shows an appearance and configuration of a contact block.

FIG. 3 shows the appearance and the configuration of the contact block 58. The contact block 58 has contact surfaces 58*a* and 58*b* having different step heights. The contact surface 58*a* has a guide groove 58*c*, and the contact surface 58*b* has a guide groove 58*d*. The guide grooves 58*c* and 58*d* have longer sides in the conveying direction of the recording medium 20.

Figure 4A:
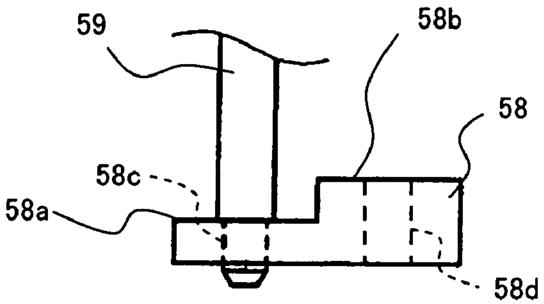
FIG. 4A shows a state in which a touch pin provided for a head holder is engaged in a guide groove of the contact block.
Figure 4B:
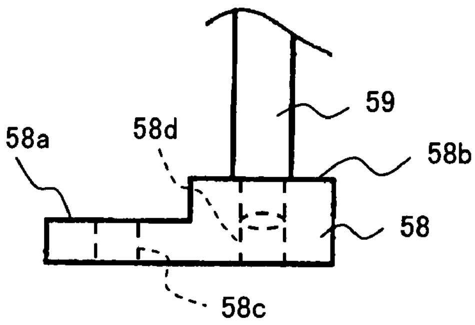
FIG. 4B shows a state in which the touch pin provided for the head holder is engaged in the guide groove of the contact block (when the head gap is large)

FIGS. 4A and 4B show the state in which the touch pins 59 provided for the head holder 9 are engaged in the guide grooves 58*c* and 58*d*. FIG. 4A shows the state in which the touch pin 59 is engaged in the guide groove 58*c*, and FIG. 4B shows the state in which the touch pin 59 is engaged in the guide groove 58*d*. By the touch pin 59 engaged in the guide groove 58*c* or 58*d*, the conveying mechanism 1 and the image recording unit 8 are positioned. That is, the positioning is performed such that the conveying surface of the recording medium 20 by the conveying belt 5 can be parallel to the nozzle surface on which a plurality of nozzles are formed on the recording head 10, and the conveying direction of the recording medium 20 can be orthogonal to the nozzle string direction of the recording head 10. Additionally, the contact block 58 is moved by the drive device not shown in the attached drawings in the arrow directions shown in FIG. 3. Thus, the guide groove in which the touch pin 59 is engaged can be selected, thereby realizing a head gap corresponding to the thickness of the recording medium 20.

A series of operations performed by the image recording apparatus 19 are described below by assuming that the conveying mechanism 1 according to the present invention has the configuration of the first mode for embodying the present invention, and the operations are processed by the program executed by the MPU of the control unit 18.

The MPU of the control unit 18 allows the pickup roller 14 to pick up the top sheet of the stacked recording medium 20 on the supply tray 13 of the feed unit 12 to start conveying the recording medium 20 to the conveying mechanism 1, and then allows the drive unit of the conveying mechanism 1 described later to be driven to start the traveling (rotation) of the conveying belt 5.

Next, the MPU of the control unit 18 sets the resist roller pair 7 of the conveying mechanism 1 as the stop mode and drives the pickup roller 14 of the feed unit 12. The recording medium 20 picked up by the pickup roller 14 is made to touch the resist roller pair 7 for a predetermined time to correct the skew.

Next, the MPU of the control unit 18 sets the resist roller pair 7 of the conveying mechanism 1 as the conveying mode, makes the resist roller pair 7 to pinch the recording medium 20, and passes it to the conveying belt 5 of the conveying mechanism 1. The recording medium 20 passed to the conveying mechanism 1 forms an upward expanded loop between the resist roller pair 7 and a belt contact roller 35 supported by an arm pair 35*a* described later to be able to rotate based on the amount of travel (conveying distance) per unit time of the resist roller pair 7 higher than the amount of travel (conveying distance) per unit time of the conveying belt 5 (refer to FIG. 8 described later).

For example, the medium detection unit 11 provided for the head holder 9 detects the end portion of the recording medium 20 that has passed the belt contact roller 35, and transmits the detection signal to the control unit 18.

Next, the MPU of the control unit 18 starts accumulating the number of pulses of a rotary encoder signal in the conveying information generation unit 6 by the trigger of the detection signal of the medium detection unit 11.

For example, when the image recording unit 8 is provided with the four recording heads 10 of cyan (C), black (K), magenta (M), and yellow (Y) in this order, the nonvolatile memory of the control unit 18 stores in advance each distance from the detection position of the medium detection unit 11 to the nozzle string of each recording head 10 after converting it into an accumulation value of the number of pulses of the rotary encoder signal.

Next, the MPU of the control unit 18 determines whether or not the accumulation value of the number of pulses of the rotary encoder signal coincides with the accumulation value of the number of pulses corresponding to each distance from the detection position of the medium detection unit 11 stored in advance in the above-mentioned nonvolatile memory to the nozzle string of each recording head 10.

Then, the MPU of the control unit 18 records an image on the recording medium 20 by discharging ink from the recording head 10 based on the record data with matching timing.

Next, the MPU of the control unit 18 allows the control unit 18 to control the eject roller pair 17 of the eject unit 15, and store the recording medium 20 on the paper eject tray 16 after the recording process.

As described above, in the image recording apparatus 19 of the present invention, since the conveying mechanism 1 corrects the skew of the recording medium 20 before performing the recording process by the image recording unit 8, a high-quality recording process can be performed.

In addition, in the image recording apparatus 19 of the present invention, since the conveying mechanism 1 does not require a component between the resist roller pair 7 and the conveying mechanism 1, the image recording apparatus 19 can be produced as a compact and inexpensive product.

When a paper jam is cleared, the MPU of the control unit 18 moves up and down the conveying mechanism 1 from the first position as an image recording position to the second position as a saving position using the up-and-down mechanism not shown in the attached drawings. When a maintaining process is performed on the recording head 10, the maintenance unit 50 is moved to the maintaining position to face the recording head 10 at the above-mentioned second position, and the recording head 10 is maintained. The process of moving the conveying mechanism 1 to the saving position is described with reference to the attached drawings relating to the mode 4 for embodying the present invention.

The configuration of the conveying mechanism is described below with reference to FIGS. 5 through 8.

Figure 5:
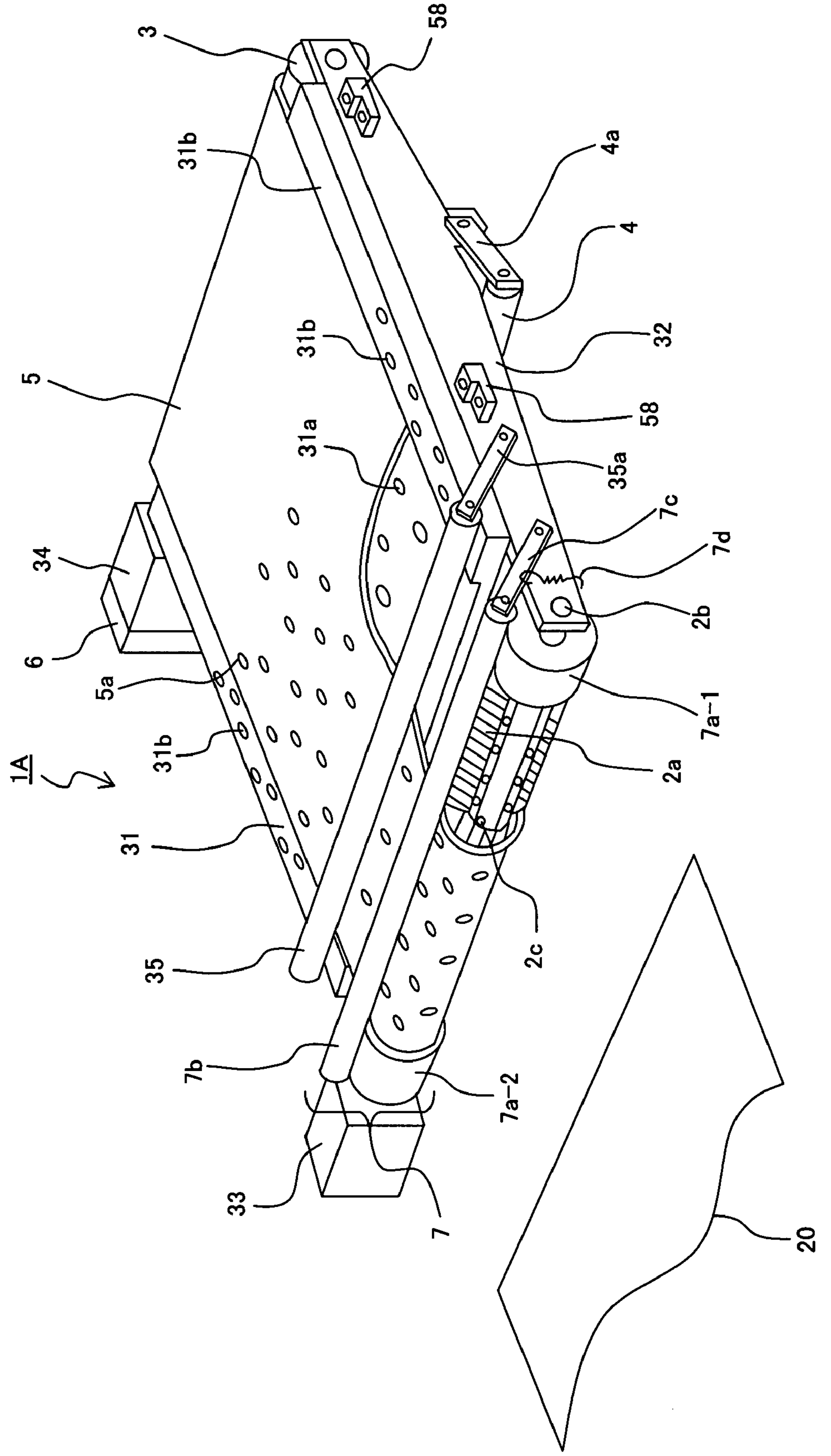
FIG. 5 is a perspective view of a conveying mechanism 1A according to the mode 1 for embodying the present invention.
Figure 6:
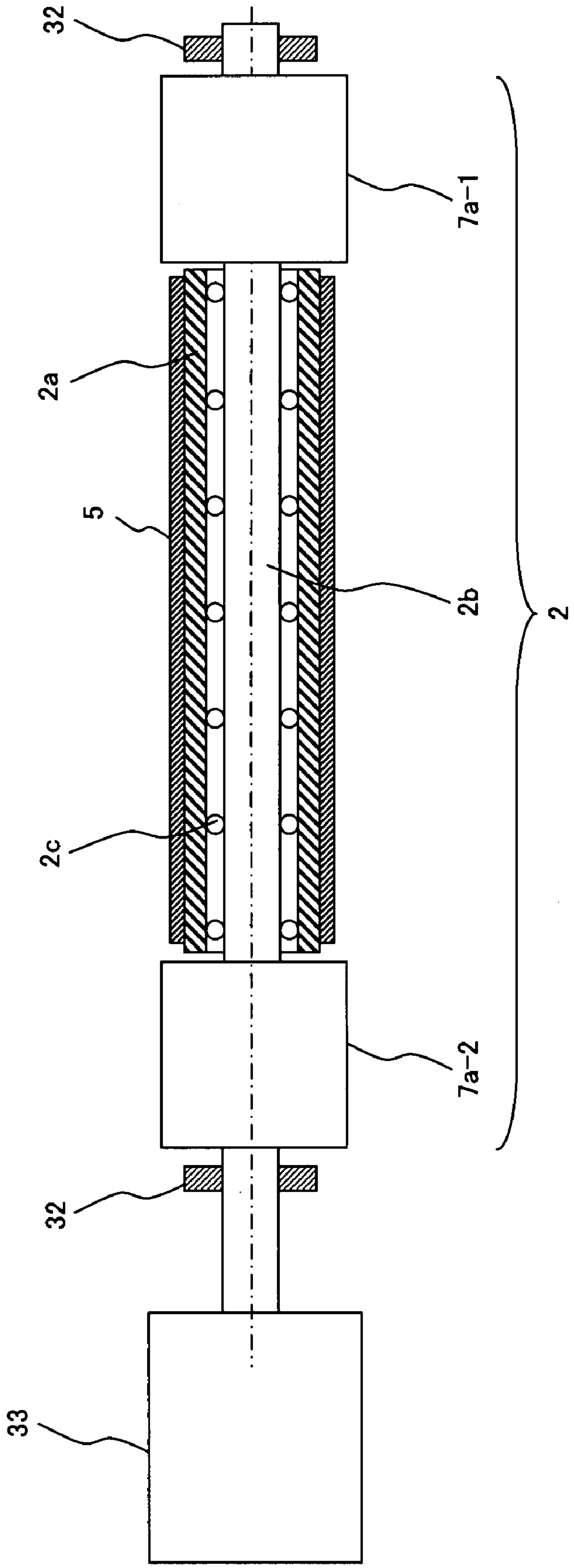
FIG. 6 is a sectional view of one roller of a resist roller pair according to the mode 1 for embodying the present invention.
Figure 7:
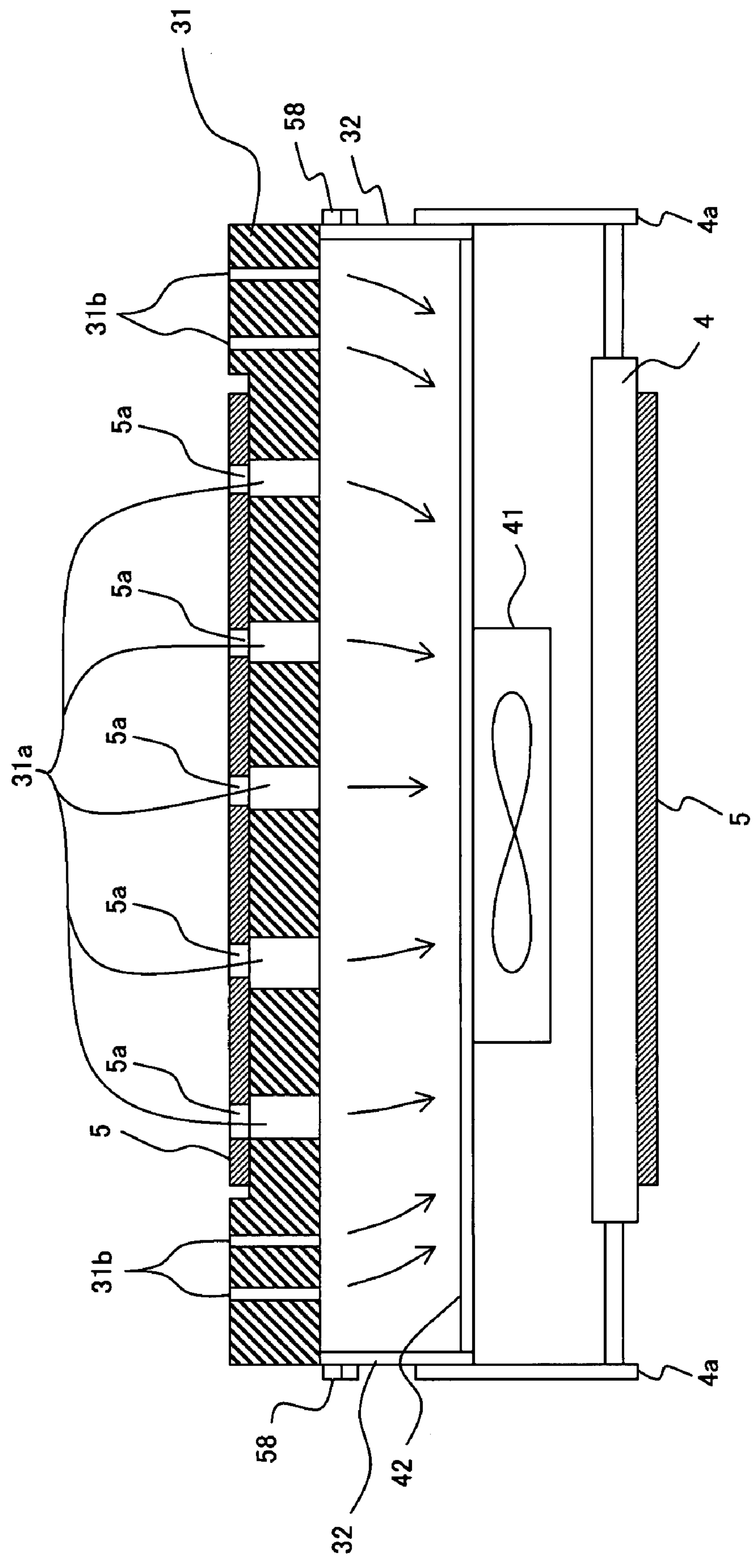
FIG. 7 is a sectional view around a platen according to the mode 1 for embodying the present invention.
Figure 8:
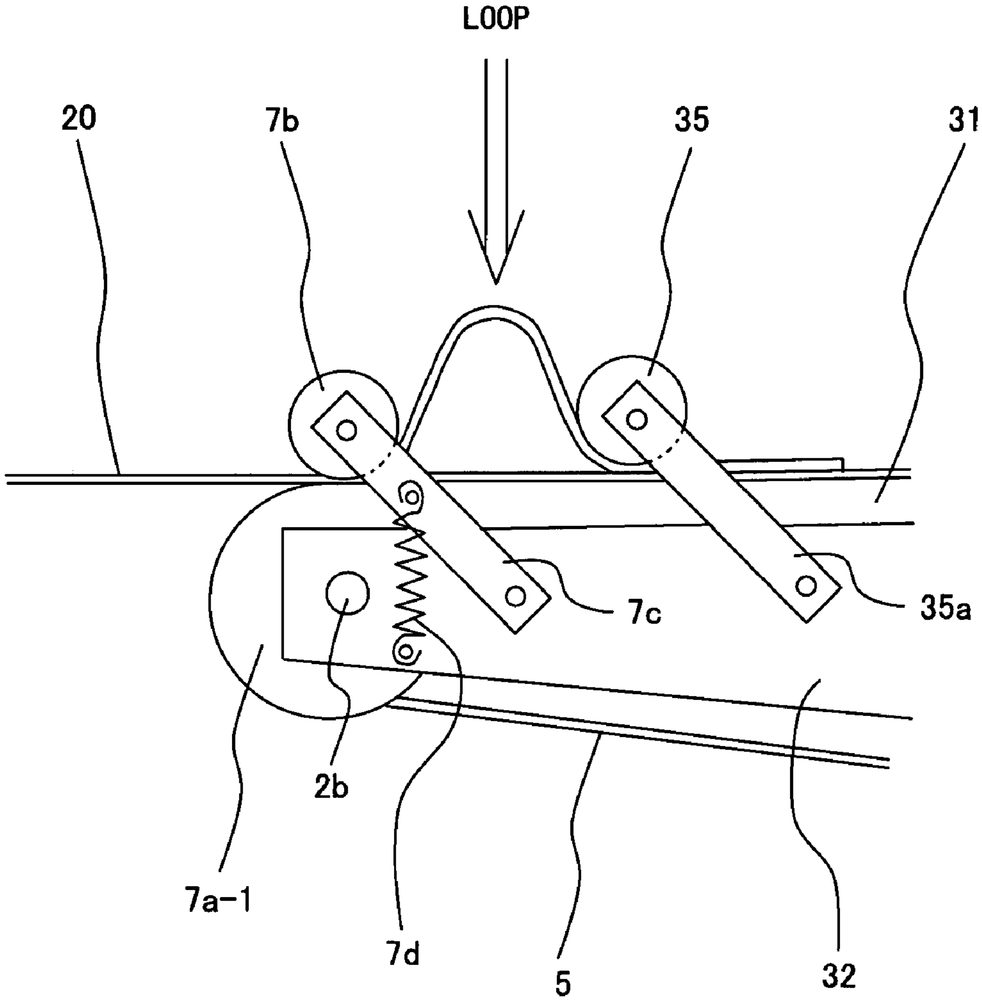
FIG. 8 shows forming of a loop for a recording medium by a conveying mechanism and conveying the recording medium.

FIG. 5 is a perspective view of the conveying mechanism 1A in the image recording apparatus according to the present invention. FIG. 6 is a sectional view of one roller of the resist roller pair 7. FIG. 7 is a sectional view around the platen. FIG. 8 shows the process of conveying the recording medium 20. FIG. 8 also applies to the modes 2 and 3 of the conveying mechanism for embodying the present invention.

The conveying mechanism 1A according to the mode 1 for embodying the present invention includes the driven roller 2, the driving roller 3 in the second belt roller, the tension roller 4, the conveying belt 5, the conveying information generation unit 6, the resist roller pair 7, a platen 31, a platen frame 32, a resist roller drive unit 33, a belt drive unit 34, the belt contact roller 35, a suction fan 41, and a suction fan attachment unit 42.

The driven roller 2 includes a conveying belt driven roller 2*a* as a first belt roller, a roller rotation shaft 2*b*, a bearing 2*c*, and a first resist roller 7*a* (7*a*-1, 7*a*-2) of one roller of the resist roller pair 7 (refer to FIG. 6).

The roller rotation shaft 2*b* is provided upstream the conveying path of the recording medium 20, and is supported with both sides rotated on the platen frame 32. The roller rotation shaft 2*b* is provided with the conveying belt driven roller 2*a* through the bearing 2*c*. The center of the rotation of the conveying belt driven roller 2*a* is designed to coincide with the center of the rotation of the roller rotation shaft 2*b*.

The conveying belt 5 is looped over the conveying belt driven roller 2*a*, the driving roller 3, and the tension roller 4. The driving roller 3 is provided substantially parallel to the conveying belt driven roller 2*a* downstream in the conveying direction of the recording medium 20. By the conveying belt 5 conveying (traveling), the conveying belt driven roller 2*a* and the tension roller 4 rotate. At this time, since the conveying belt driven roller 2*a* is supported by the roller rotation shaft 2*b* through the bearing 2*c*, the roller rotation shaft 2*b* does not rotate with the rotation of the conveying belt driven roller 2*a*.

Furthermore, for the roller rotation shaft 2*b*, the first resist roller 7*a* (7*a*-1, 7*a*-2) of one roller of the resist roller pair 7 is incorporated or fixed in one unit enclosing the conveying belt driven roller 2*a*. For example, a motor of the resist roller drive unit 33 for rotating the first resist roller 7*a* (7*a*-1, 7*a*-2) is connected to the roller rotation shaft 2*b*. With the configuration, by driving the resist roller drive unit 33, the first resist roller 7*a* (7*a*-1, 7*a*-2) rotates in synchronization with the roller rotation shaft 2*b*. The center of the rotation of the first resist roller 7*a* is designed to coincide with the center of the rotation of the roller rotation shaft 2*b*. The diameter of the first resist roller 7*a* is equal to or more than the diameter of the conveying belt driven roller 2*a*. In more detail, the diameter of the first resist roller 7*a* is designed to be equal to or more than the diameter of the conveying belt driven roller 2*a* plus the thickness of the conveying belt 5.

Thus, by supporting the conveying belt driven roller 2*a* for rotation on the roller rotation shaft 2*b* and forming or fixedly supporting the first resist roller 7*a*, the conveying belt driven roller 2*a* coaxially arranged with the first resist roller 7*a* can be independently rotated.

The driving roller 3 is provided downstream substantially parallel to the conveying direction with both end portions supported by the platen frame 32 such that it can be rotated. The driving roller 3 is connected to the rotation shaft of, for example, a motor in the belt drive unit 34. By the rotation of the motor, the driving roller 3 rotates, and the conveying belt 5 performs conveyance (travel).

The tension roller 4 has a rotation member pair 4*a*. One end of the rotation member pair 4*a* is supported for rotation on the platen frame 32. The other end supports the tension roller 4 such that the roller can freely rotate. The tension roller 4 is arranged substantially parallel to the driven roller 2 between the driven roller 2 and the driving roller 3 in the conveying direction of the recording medium 20. The conveying belt 5 can be held under tension by the tension roller 4 outward from inside of the conveying belt 5 looped over the conveying belt driven roller 2*a* and the driving roller 3.

The conveying belt 5 is configured by an endless belt having a plurality of holes 5*a*. By rotating the driving roller 3, the conveying belt 5 places on the received recording medium 20 and conveys them downstream the conveying path.

The conveying information generation unit 6 is configured by a rotary encoder as described above, and the rotation shaft of the rotary encoder is connected to the rotation shaft of the motor of the belt drive unit 34. The conveying information generation unit 6 generates a pulse signal corresponding to the amount of travel of the conveying belt 5, and transmits it to the control unit 18.

The resist roller pair 7 is provided upstream the conveying path of the recording medium 20, and includes the first resist roller 7*a* (7*a*-1, 7*a*-2), a second resist roller 7*b*, an arm pair 7*c*, and a spring pair 7*d*.

The first resist roller 7*a* (7*a*-1, 7*a*-2) is incorporated or fixed to the roller rotation shaft 2*b* as one unit as described above, and the center of the rotation of the first resist roller 7*a* is designed to coincide with the center of the rotation of the roller rotation shaft 2*b*. To rotate the first resist roller 7*a* as one of the resist roller pair 7, a rotation shaft of, for example, a motor in the resist roller drive unit 33 is connected to the roller rotation shaft 2*b*. By the rotation of the motor, the first resist roller 7*a* as one of the resist roller pair 7 can rotate.

The second resist roller 7*b* is supported and rotates by one end of the arm pair 7*c* whose other end is supported and rotates by the platen frame 32. The arm pair 7*c* is provided with the spring pair 7*d* whose one end is connected to the platen frame 32 and other end is connected to the arm pair 7*c*. By the spring pair 7*d*, the second resist roller 7*b* is urged toward the first resist roller 7*a*, and contacts the first resist roller 7*a*. With the above-mentioned configuration, the first resist roller pair 7*a* and the second resist roller 7*b* pinches the recording medium 20 conveyed from upstream the conveying path by the rotation of the first resist roller 7*a*, and conveys it downstream the conveying path.

The first resist roller 7*a* of the resist roller pair 7 is configured by an elastic member having a large friction coefficient such as rubber. The second resist roller 7*b* of the resist roller pair 7 is configured by a metal roller of high rigidity. Thus, the resist roller pair 7 can correctly attain contact without a gap.

The belt contact roller 35 has the arm pair 35*a*. One end of the arm pair 35*a* is supported for rotation on the platen frame 32, and the other end supports both sides of the belt contact roller 35 such that the belt contact roller 35 can rotate. When the recording medium 20 conveyed by the resist roller pair 7 is placed on the conveying belt 5 and conveyed as shown in FIG. 8, the belt contact roller 35 forms the upward expanded loop of the recording medium 20 between the resist roller pair 7 and the belt contact roller 35 using the fact that the amount of travel (conveyance distance) per unit time by the resist roller pair 7 is larger than the amount of travel (conveyance distance) of the conveying belt 5 by the conveying mechanism 1 (1A).

Thus, when the recording medium 20 placed on the conveying belt 5 is conveyed, prevented is an excess load applied in conveying the recording medium 20 on the conveying belt 5 by, for example, the force in the opposite direction of the conveying direction of the recording medium 20 by the conveyance of the resist roller pair 7.

The difference in amount of travel between the conveying belt 5 and the resist roller pair 7 can be easily realized by making the rotation speed of the motor in the resist roller drive unit 33 faster than the rotation speed of the motor by the belt drive unit 34.

The conveying mechanism 1 (1A) according to the present invention can form an upward expanded loop between the resist roller pair 7 and the belt contact roller 35 although the rotation speeds of both motors are the same.

This can be realized by allowing the center of the rotation of the first resist roller 7*a* to coincide with the center of the rotation of the conveying belt driven roller 2*a*, and making the diameter of the first resist roller 7*a* larger than the diameter of the driving roller 3 having the same roller diameter as the conveying belt driven roller 2*a*.

The platen 31 is provided with a plurality of holes 31*a* and air holes 31*b* (refer to FIG. 7). The platen 31 is fixed to the platen frame 32 to contact the inner of the conveying belt 5. The suction fan 41 attached to the suction fan attachment unit 42 is provided below the platen 31 (refer to FIG. 7). The suction fan attachment unit 42 is fixed to the platen frame 32.

The suction fan 41 allows the recording medium 20 to be adsorbed onto the conveying belt 5 through the plurality of holes 5*a* made in the conveying belt 5 and the plurality of holes 31*a* made in the platen 31. By providing the air holes 31*b* for the platen 31, the suction fan 41 can allow the side end portion of the recording medium 20 to be adsorbed onto the platen 31. Thus, the recording medium 20 can be conveyed while closely contacting the conveying mechanism 1.

The operations of the conveying mechanism 1A with the above-mentioned configuration are described below in detail.

The recording medium 20 picked up by the pickup roller 14 is conveyed toward the resist roller pair 7. At this time, since the resist roller drive unit 33 connected to the roller rotation shaft 2*b* is not driven, the resist roller pair 7 does not rotate. Thus, the skew of the recording medium 20 can be corrected by conveying the recording medium 20 picked up by the pickup roller 14 such that the recording medium 20 can tightly touch the resist roller pair 7 for a predetermined time.

When the skew of the recording medium 20 is corrected, the resist roller drive unit 33 is driven, and the roller rotation shaft 2*b* and the first resist roller 7*a* (7*a*-1, 7*a*-2) are rotated. Thus, the recording medium 20 is pinched by the first resist roller 7*a* (7*a*-1, 7*a*-2) and the second resist roller 7*b*, passed on the conveying belt 5 of the conveying mechanism 1 and conveyed. At this time, the conveying belt driven roller 2*a* is driven by the conveyance (travel) of the conveying belt 5 and rotated. However, since the conveying belt driven roller 2*a* is supported for rotation on the roller rotation shaft 2*b* through the bearing 2*c*, the conveying belt 5 can be conveyed without the influence of the rotation of the resist roller pair 7. Thus, by independently rotating the conveying belt driven roller 2*a* and the first resist roller 7*a* (7*a*-1, 7*a*-2) on the roller rotation shaft 2*b*, a compact and inexpensive apparatus can be configured. Furthermore, since the skew of the recording medium 20 can be corrected by the resist roller pair 7, a high-quality recording process can be performed.

As described above, according to the image recording apparatus of the present invention, the recording medium 20 can be corrected such that it can be correctly aligned in the conveying direction of the conveying belt 5 by allowing the center of the rotation of the first resist roller 7*a* of the resist roller pair 7 to coincide with the center of the rotation of the conveying belt driven roller 2*a* rotated by the conveyance (travel) of the conveying belt 5. Since the conveying belt driven roller 2*a* and the first resist roller 7*a* (7*a*-1, 7*a*-2) can be independently rotated, a compact and inexpensive apparatus can be configured.

According to the mode 1 for embodying the present invention, the first resist roller 7*a* is rotated to rotate the resist roller pair 7, but the present invention is not limited to this configuration, and the resist roller drive unit 33 can be connected to the second resist roller 7*b* so that the rotation of the second resist roller 7*b* can be transmitted to the first resist roller 7*a*.

Figure 9:
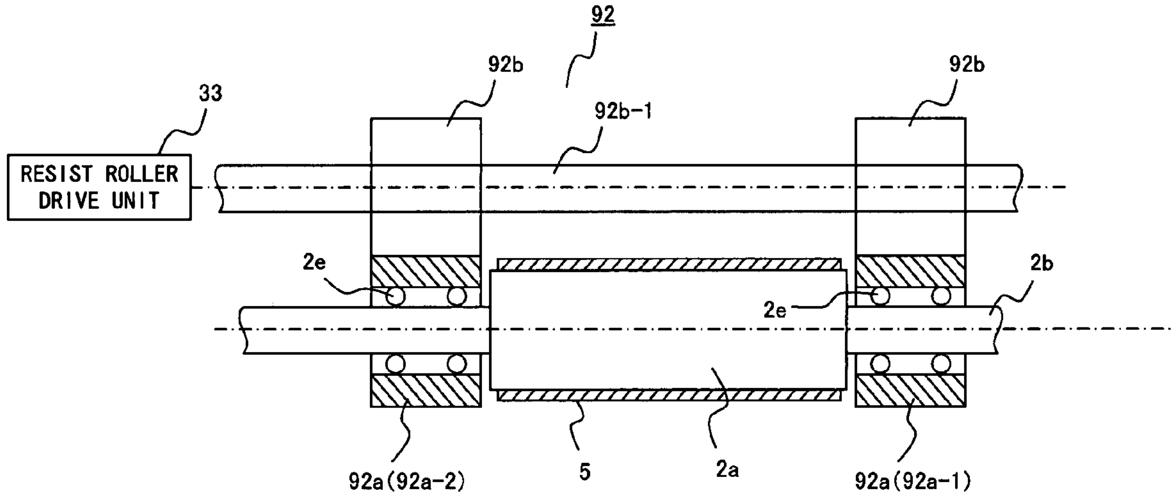
FIG. 9 shows an example of a variation according to the mode 1 for embodying the present invention.

FIG. 9 shows an example of a variation of the mode 1 for embodying the present invention, and a resist roller pair 92 is configured by a first resist roller 92*a* and a second resist roller 92*b*. The resist roller drive unit 33 is connected to a rotation shaft 92*b*-1 of the second resist roller 92*b*. The second resist roller 92*b* is incorporated or fixed into the rotation shaft 92*b*-1. On the other hand, the first resist roller 92*a* (92*a*-1, 92*a*-2) has the roller rotation shaft 2*b* as a rotation shaft, and has a bearing 2*e* between the first resist roller 92*a* (92*a*-1, 92*a*-2) and the roller rotation shaft 2*b*.

The conveying belt driven roller 2*a* is incorporated or fixed into the roller rotation shaft 2*b*.

Therefore, in an example of a variation shown in FIG. 9 unlike the configuration shown in FIG. 6, the roller rotation shaft 2*b* rotates with the rotation of the conveying belt driven roller 2*a*. At this time, since there is the bearing 2*e* between the roller rotation shaft 2*b* and the first resist roller 92*a* (92*a*-1, 92*a*-2), the rotation of the roller rotation shaft 2*b* is not transmitted to the first resist roller 92*a*. Therefore, the recording medium 20 can be pinched and conveyed by the first resist roller 92*a* with the rotation of the second resist roller 92*b*. Thus, also according to the present variation example, the conveying belt driven roller 2*a* and the first resist roller 92*a* can be independently rotated. As a result, a compact and inexpensive apparatus can be configured, and a high-quality recording process can be performed. In this variation example, the belt drive unit 34 can be connected to the roller rotation shaft 2*b* (driven roller 2) or the driving roller 3.

Figure 11:
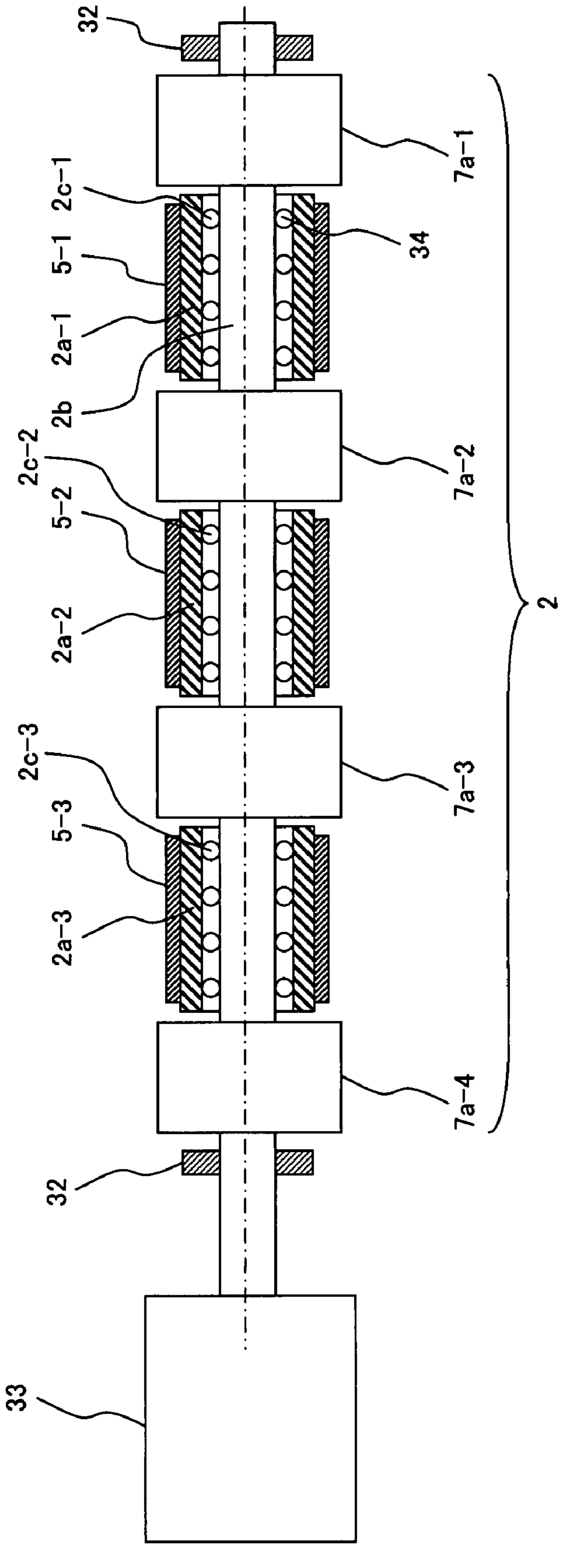
FIG. 11 is a sectional view of one roller of a resist roller pair according to the mode 2 for embodying the present invention.
Figure 12:
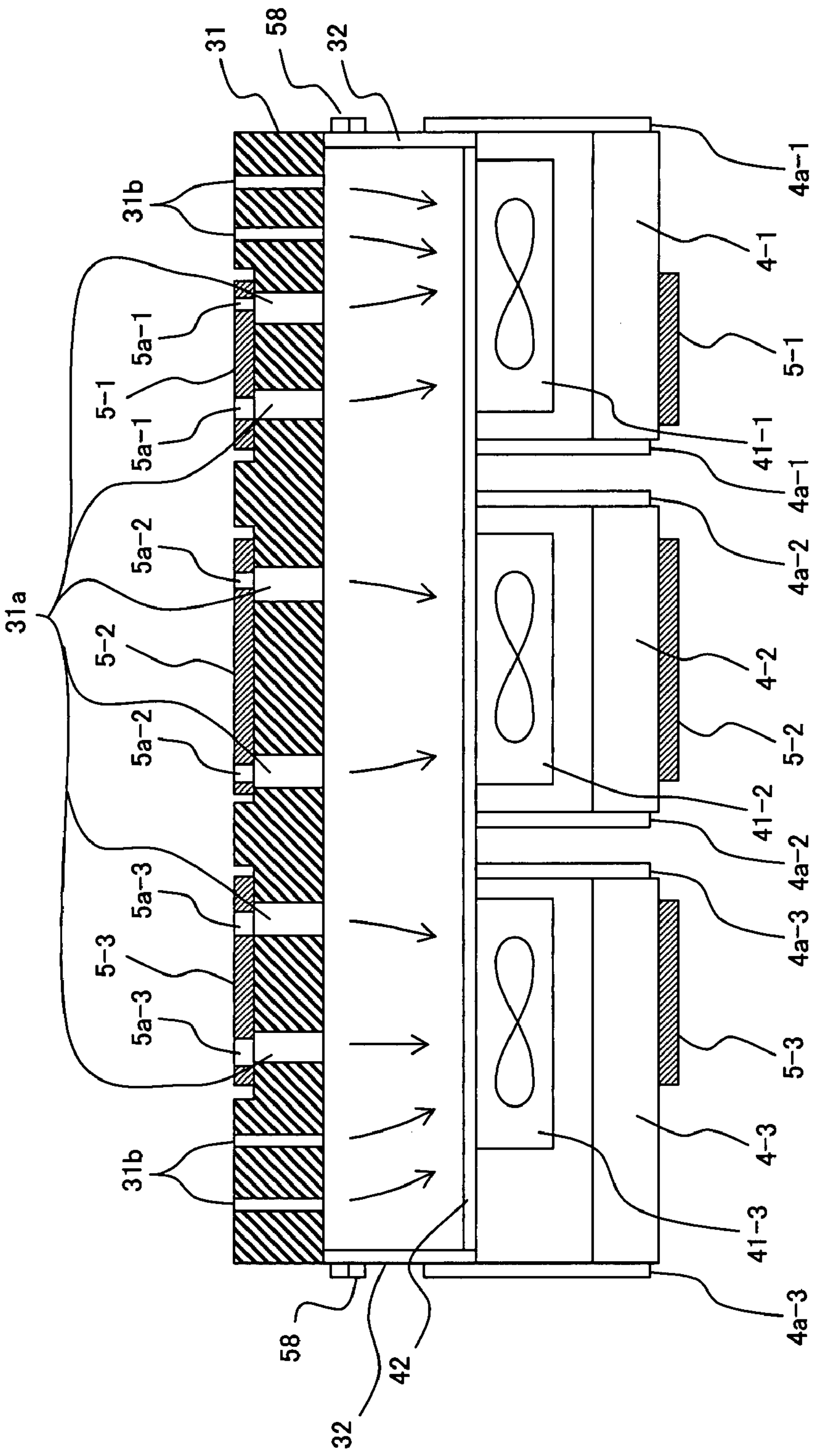
FIG. 12 is a sectional view around a platen according to the mode 2 for embodying the present invention.

Next, the image recording apparatus according to the mode 2 for embodying the present invention is described below with reference to FIGS. 10 through 12.

Figure 10:
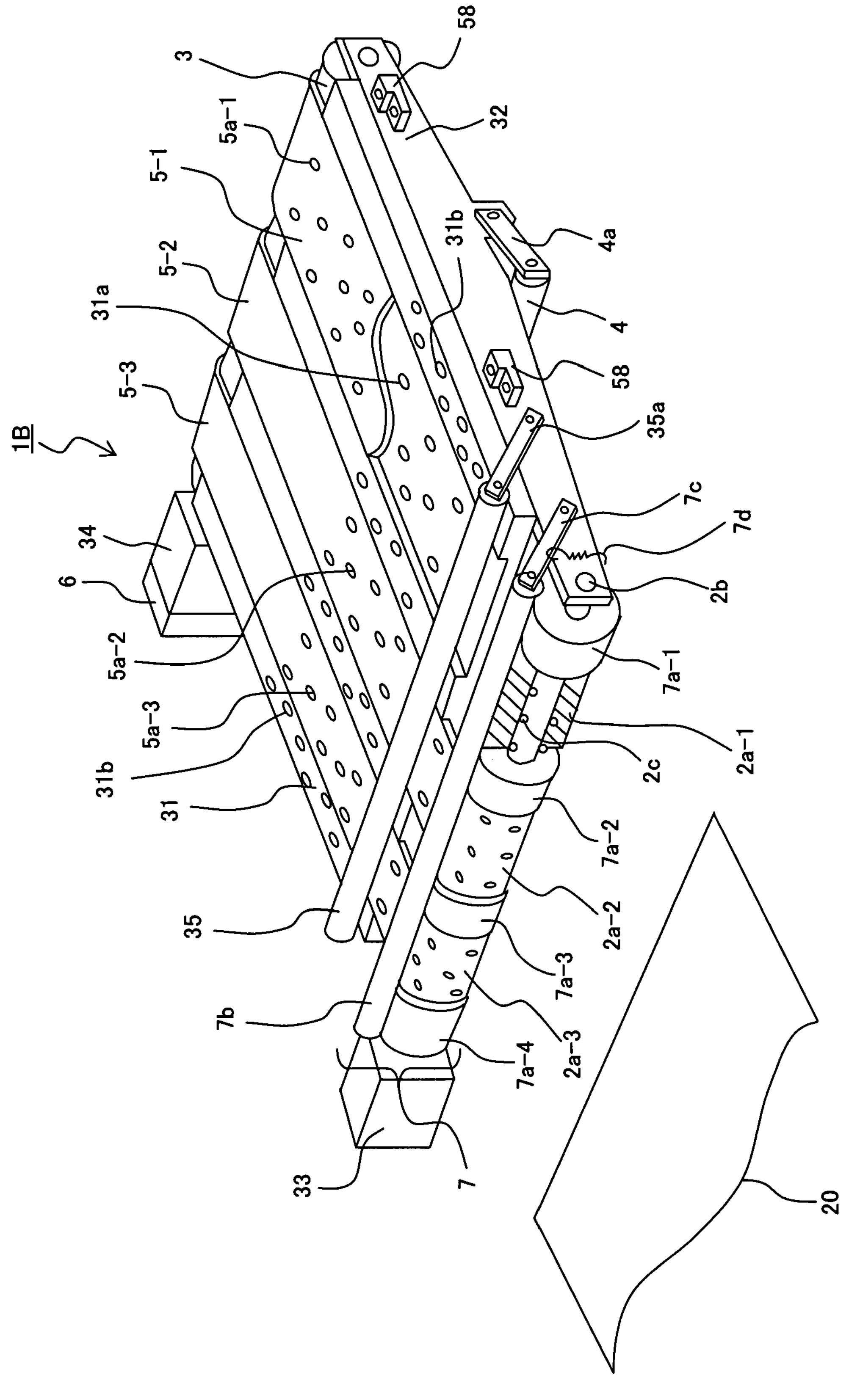
FIG. 10 is a perspective view of a conveying mechanism 1B according to the mode 2 for embodying the present invention.

FIG. 10 is a perspective view of a conveying mechanism 1B in the image recording apparatus according to the mode 2 for embodying the present invention. FIG. 11 is a sectional view of one roller of a resist roller pair in the mode 2 for embodying the present invention. FIG. 12 is a sectional view around a platen according to the mode 2 for embodying the present invention.

An equivalent component in the mode 1 for embodying the present invention is assigned the same reference numeral, and only a portion different from the mode 1 for embodying the present invention is described below.

The conveying mechanism 1B in the mode 2 for embodying the present invention is different from the mechanism 1A in the mode 1 in that the conveying belt driven roller 2*a* in the first belt roller has a plurality of conveying belt driven rollers 2*a*-1 through 2*a*-3, the tension roller 4 supported for rotation by the rotation member pair 4*a* has tension rollers 4-1 through 4-3 supported for rotation by a plurality of rotation member pairs 4*a*-1 through 4*a*-3, the conveying belt 5 has a plurality of conveying belts 5-1 through 5-3, the first resist roller 7*a* (7*a*-1, 7*a*-2) of the resist roller pair 7 has a first resist roller 7*a* (7*a*-1 through 7*a*-4), and the suction fan 41 has a plurality of suction fans 41-1 through 41-3.

Thus, while the conveying mechanism 1A according to the mode 1 for embodying the present invention can be applied only to the recording medium 20 of only one size, the conveying mechanism 1B according to the mode 2 for embodying the present invention can also be applied to the recording medium 20 of a plurality of sizes (recording medium have different widths).

In the image recording apparatus 19 including the conveying mechanism 1B, for example, the MPU of the control unit 18 allows the control unit 18 to drive only the suction fan 41-2 depending on the size of the recording medium 20, or to control the suction force by the suction fans 41-1 and 41-3 to be lower than the force of the suction fan 41-2, thereby allowing the recording medium 20 to be appropriately adsorbed onto the conveying belts 5-1 through 5-3.

As described above, the conveying mechanism 1B of the image recording apparatus according to the mode 2 for embodying the present invention has an effect equivalent to the mode 1 for embodying the present invention, and the conveying belt 5 is changed into the configuration including the plurality of conveying belts 5-1 through 5-3, thereby correctly applying the apparatus to the recording medium 20 of various sizes (recording medium have different widths).

The image recording apparatus according to the mode 3 for embodying the present invention is described below with reference to FIG. 13.

Figure 13:
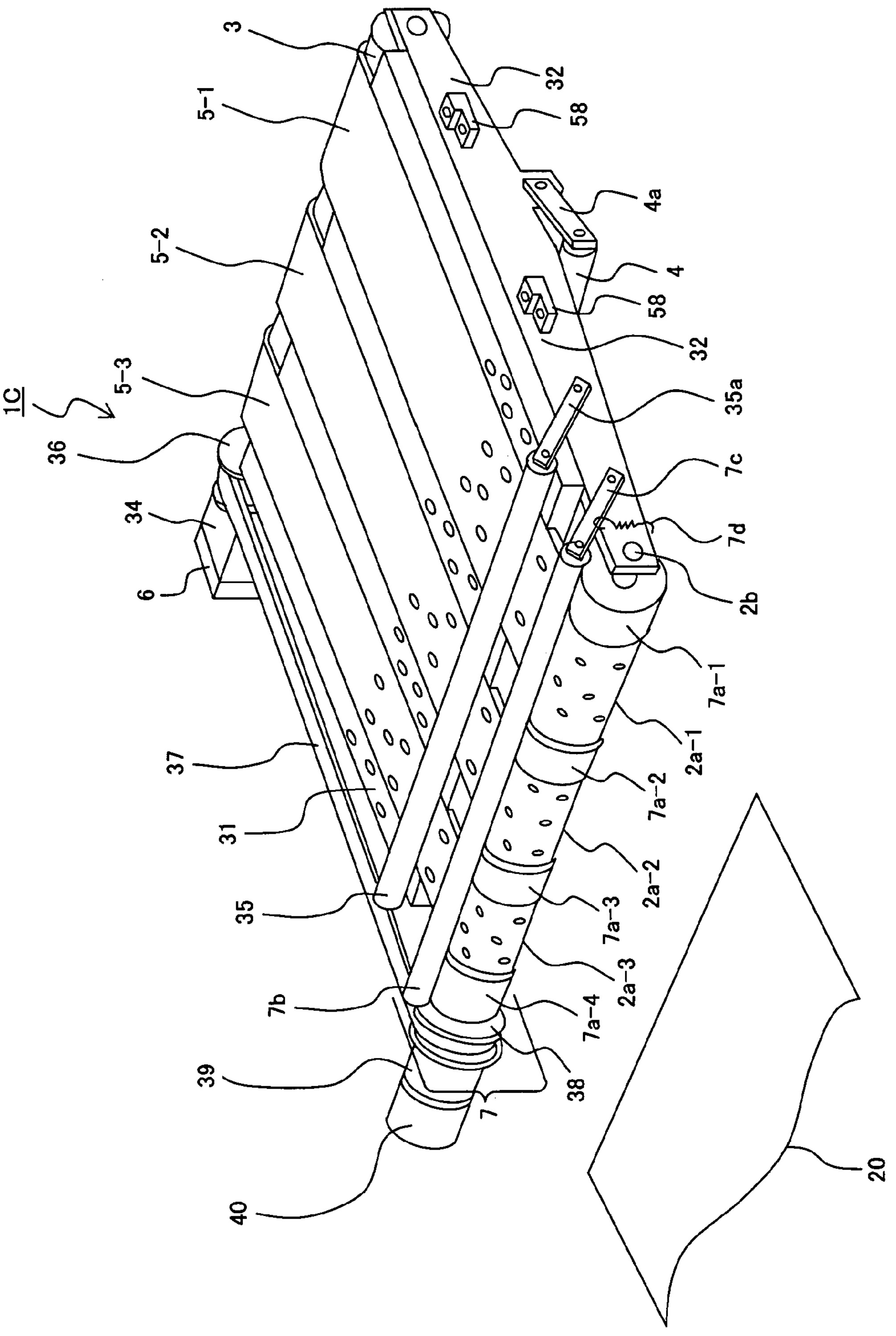
FIG. 13 is a perspective view of a conveying mechanism 1C according to the mode 3 for embodying the present invention.

FIG. 13 is a perspective view of a conveying mechanism 1C in the image recording apparatus according to the mode 3 for embodying the present invention. The components equivalent to the modes 1 and 2 for embodying the present invention are assigned the same reference numerals, and only different portions are described below.

The conveying mechanism 1C according to the mode 3 for embodying the present invention is different from the conveying mechanism 1B according to the mode 2 in that the driving roller 3 is provided with a belt drive pulley 36, the driven roller 2 is provided with a roller drive pulley 38, a transmission belt 37 is looped over the belt drive pulley 36 and the roller drive pulley 38, and a first switch clutch 39 and a second switch clutch 40 replace the resist roller drive unit 33. The mode 3 for embodying the present invention is described with reference to the conveying mechanism 1B of the mode 2, but can also be described with reference to the conveying mechanism 1A according to the mode 1 for embodying the present invention.

While the conveying mechanism 1B according to the mode 2 drives the resist roller pair 7 by the resist roller drive unit 33, the conveying mechanism 1C according to the mode 3 drives it by transmitting/not transmitting the drive force of the belt drive unit 34 by switching the first switch clutch 39 (coupled/free) and the second switch clutch 40 (stop/free).

When the skew of the recording medium 20 is corrected by the resist roller pair 7, the conveying mechanism 1C according to the mode 3 for embodying the present invention switches the first switch clutch 39 into the free status and the second switch clutch 40 into the stop status.

When the conveying mechanism 1C according to the mode 3 for embodying the present invention pinches and conveys the recording medium 20 using the resist roller pair 7, the first switch clutch 39 is coupled to the roller drive pulley 38, and the second switch clutch 40 is switched into the free status, thereby transmitting the drive force of, for example, the motor in the belt drive unit 34 to the first resist roller 7*a* through the transmission belt 37.

Furthermore, if the conveying mechanism 1C according to the mode 3 for embodying the present invention makes the resist roller pair 7 to be driven through the recording medium 20 when the recording medium 20 is conveyed by the plurality of conveying belts 5-1 through 5-3 using the motor in the belt drive unit 34, the first switch clutch 39 and the second switch clutch 40 are switched into the free status.

As described above, according to the conveying mechanism 1C of the image recording apparatus of the mode 3 for embodying the present invention, the effect equivalent to the above-mentioned modes 1 and 2 for embodying the present invention can be obtained, and the drive force of the belt drive unit 34 is transmitted/not transmitted by switching at least one of the first switch clutch 39 and the second switch clutch 40 after the stopping, driving, or driven operation of the resist roller pair 7. Therefore, the power consumption can be reduced.

The image recording apparatus according to the mode 4 for embodying the present invention is described below with reference to FIG. 14.

In the description of the mode 4 for embodying the present invention, the description of the conveying mechanism 1B of the mode 2 is used, but the description of the conveying mechanism 1A according to the mode 1 and the conveying mechanism 1C according to the mode 3 can also be applied.

The image recording apparatus according to the mode 4 for embodying the present invention is different in configuration from the apparatus according to the modes 1 through 3 for embodying the present invention in that a extended arm from the head holder to the paper feed side supports the roller rotation shaft 2*b* for rotation.

Figure 1:
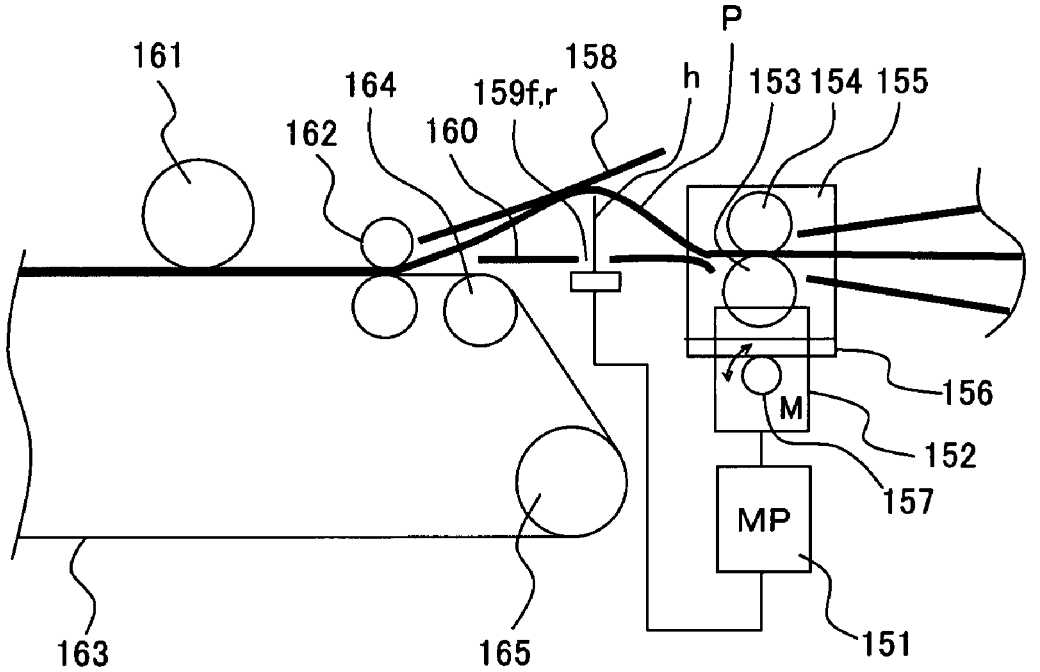
FIG. 1 is an explanatory view of the conventional sheet conveying device.

In the present mode for embodying the present invention, the image recording apparatus 19 includes the conveying mechanism 1 (1B), the image recording unit 8 provided above and opposite the conveying mechanism 1, the feed unit 12 provided the most upstream the conveying path of the recording medium to convey downstream the plurality of recording medium 20 stored in the supply tray 13, the eject unit 15 for ejecting and collecting the recording medium recorded by the image recording unit 8; and the maintenance unit 50 for maintaining the recording head. The control unit 18 shown in FIG. 1 is omitted in FIG. 14.

Figure 15:
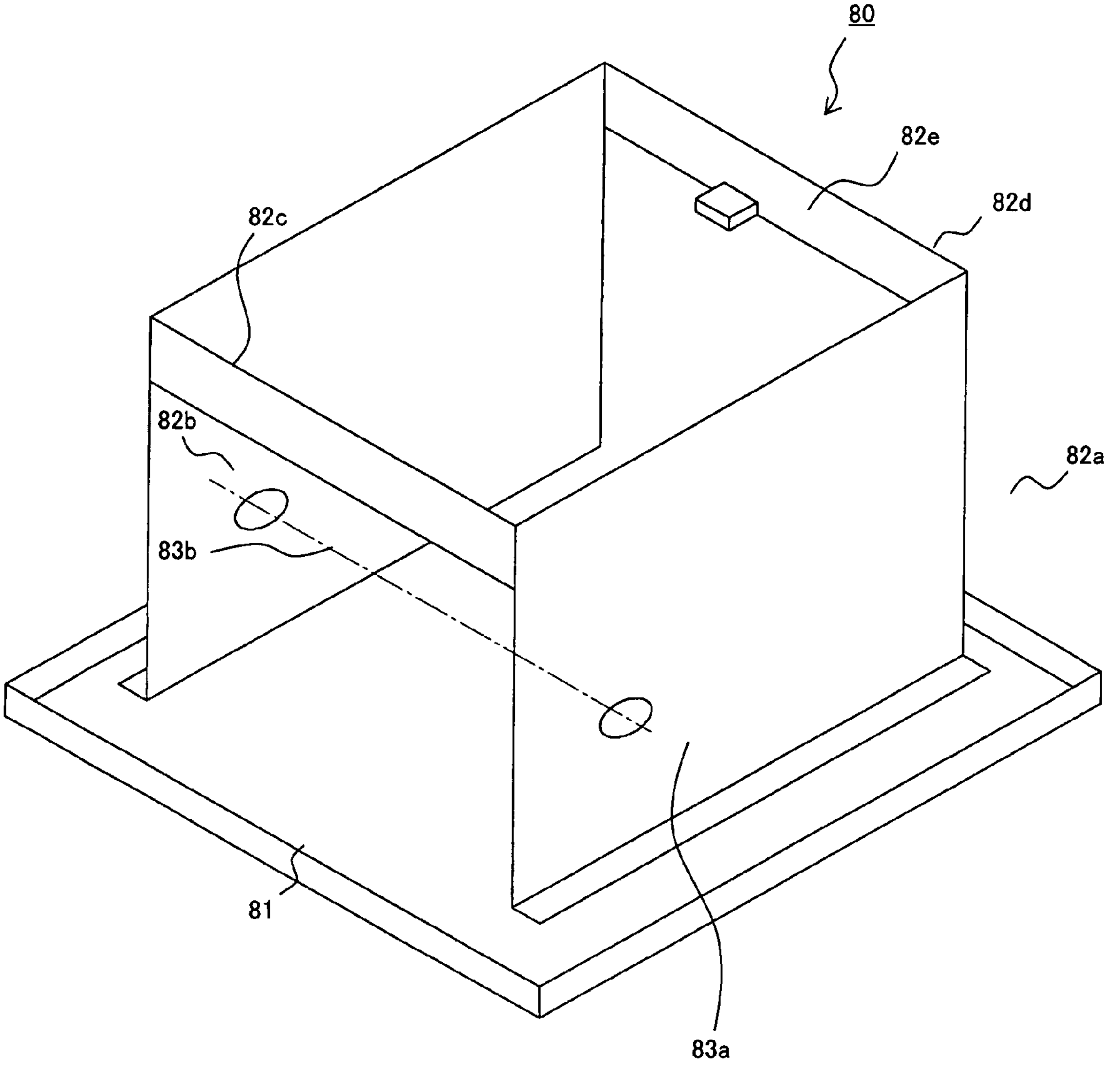
FIG. 15 is an explanatory view of the configuration of an apparatus frame.

The image recording apparatus with the above-mentioned configuration is stored in an apparatus frame 80 shown in FIG. 15. The apparatus frame 80 includes a base plate 81 and a pair of side plates 82*a* and 82*b* for the base plate 81. Supports 82*c* and 82*d* are provided between the side plates 82*a* and 82*b* to guarantee the rigidity. The support 82*d* is provided with a support member 82*e* for supporting the eject side of the head holder 9.

The side plates 82*a* and 82*b* are provided with holes 83*a* and 83*b*. The roller rotation shaft 2*b* is engaged in the holes 83*a* and 83*b* which support the roller rotation shaft 2*b* for rotation. The rotation shaft of the pickup roller 14 is also supported for rotation by the holes not shown in the attached drawings but formed in the side plates 82*a* and 82*b* of the apparatus frame 80.

Figure 16A:
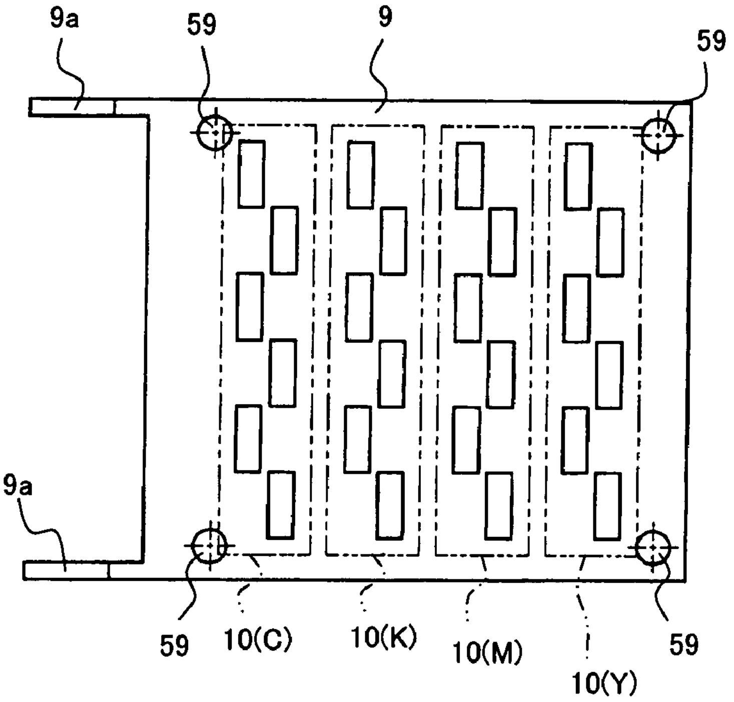
FIG. 16A is a plan view of a head holder.
Figure 16B:
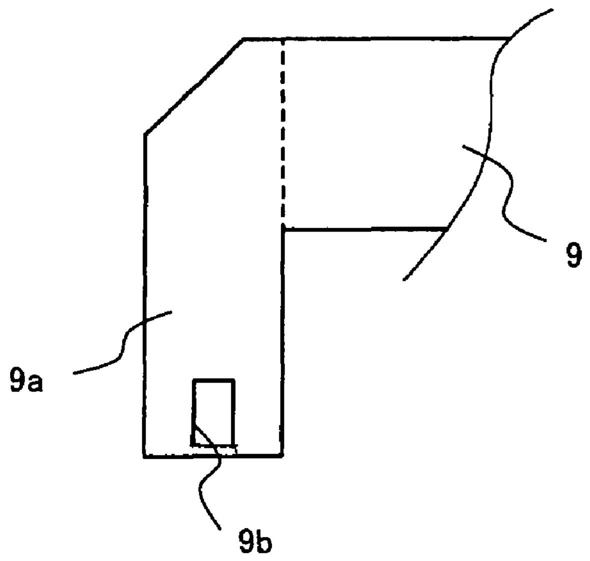
FIG. 16B is a side view of an extended arm formed on the head holder.

FIG. 16 is an explanatory view of the configuration of the head holder 9. FIG. 16A is a plan view of the head holder 9. FIG. 16B is a side view of the extended arm 9*a* formed on the head holder 9. The head holder 9 holds the recording heads 10 for various colors for discharging ink to the recording medium 20. The touch pin 59 for the contact block 58 provided on the platen frame 32 are provided at the four corners of the head holder 9. By the touch pins 59 engaged in the contact block 58, the image recording unit 8 can be substantially parallel to the conveying mechanism 1 (1B). The space between the image recording unit 8 and the conveying mechanism 1 (1B) can be adjusted by the touch pin 59 and the contact block 58.

The head holder 9 is provided with the extended arm 9*a* toward the input side of the recording medium 20 in the conveying mechanism 1 (1B). A long hole 9*b* is made for the extended arm 9*a*. The long hole 9*b* supports the roller rotation shaft 2*b* for vertical travel only (in the longitudinal direction).

The arrangement of the conveying mechanism 1 (1B), the image recording unit 8, and the apparatus frame 80 is described below with reference to FIG. 17.

Figure 17A:
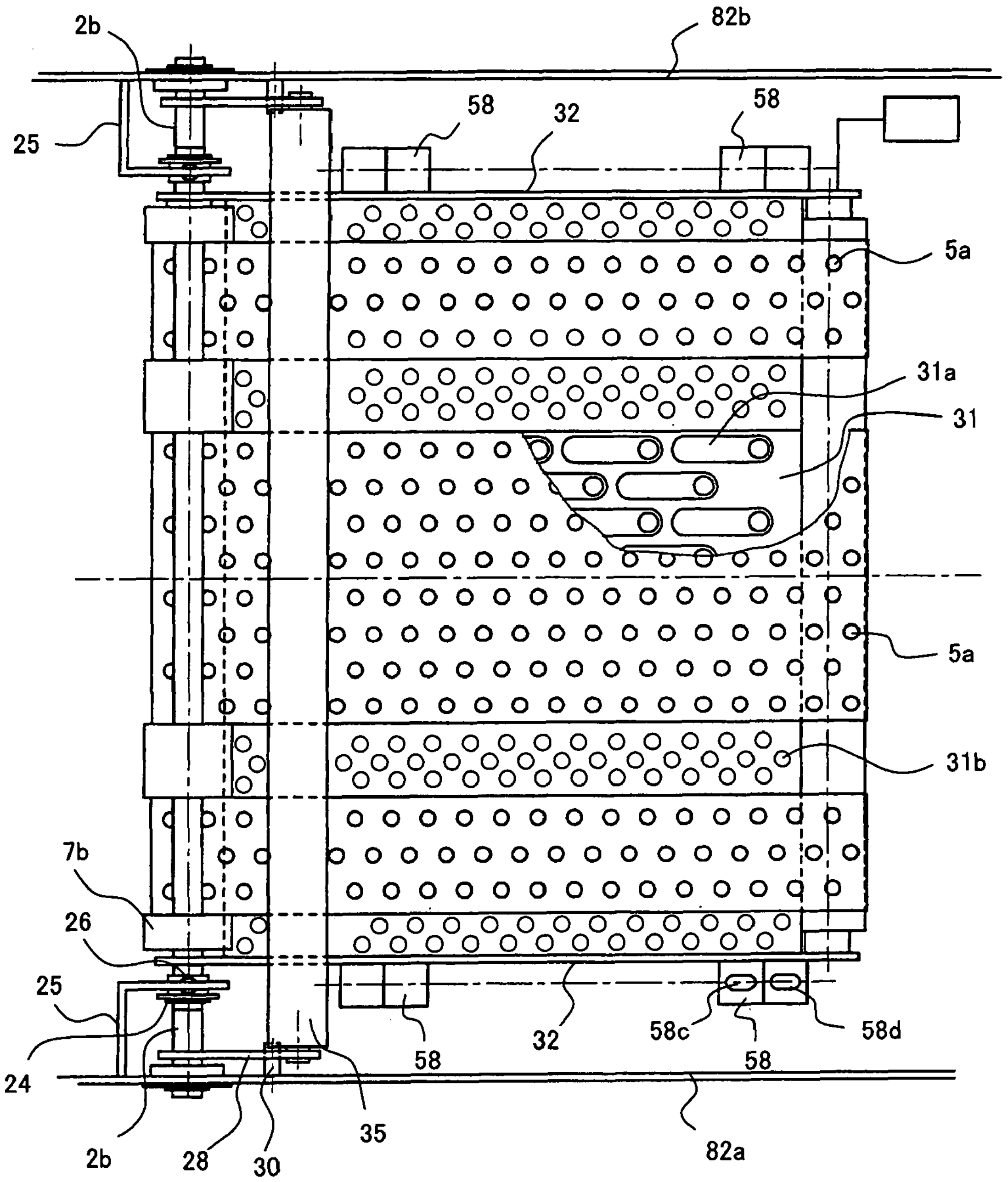
FIG. 17A shows a state in which a conveying mechanism is attached to the apparatus frame.
Figure 17B:
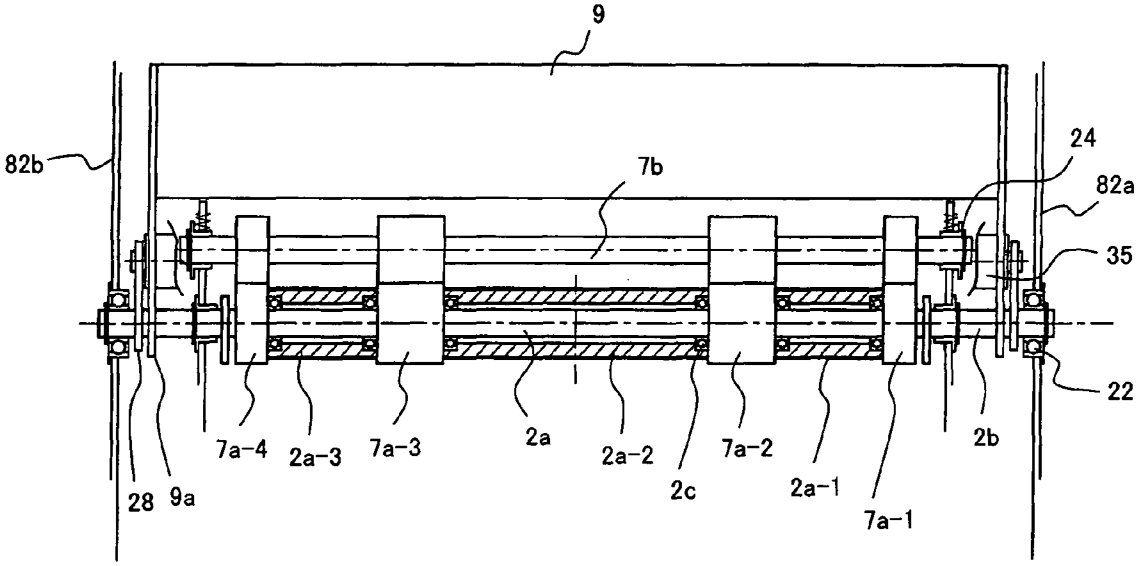
FIG. 17B is a sectional view from the supply side of the recording medium around a resist roller pair.
Figure 17C:
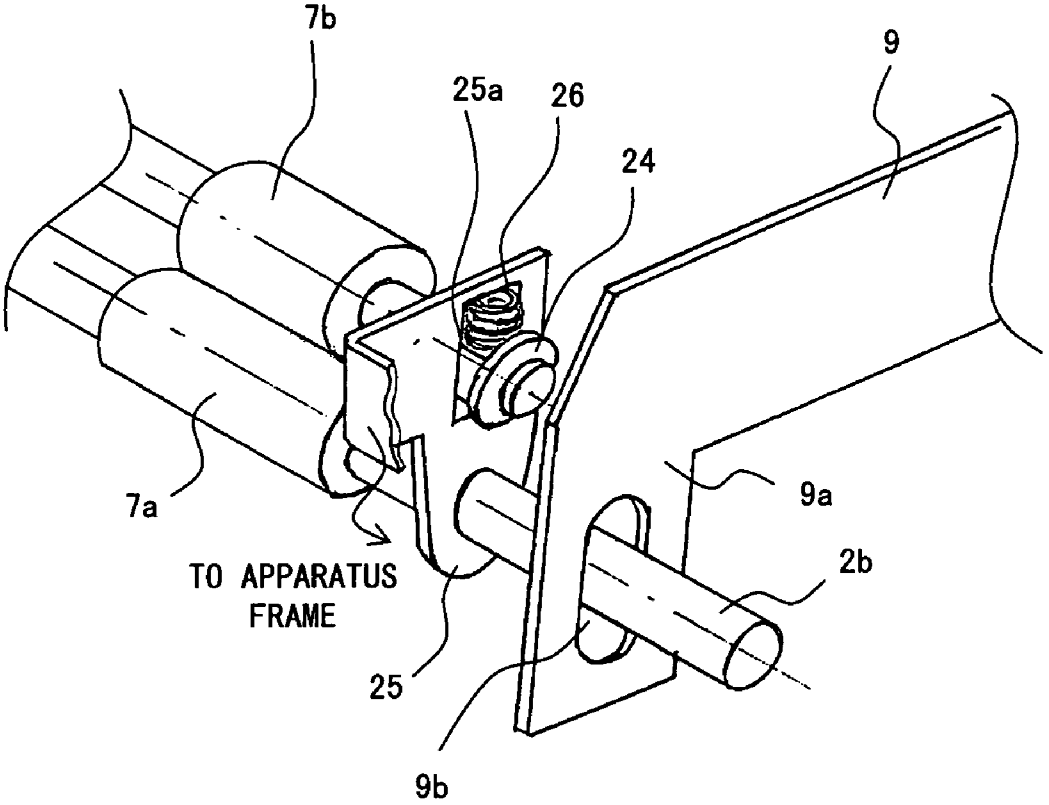
FIG. 17C shows a configuration of a roller rotation shaft and the end of a second resist roller.
Figure 17D:
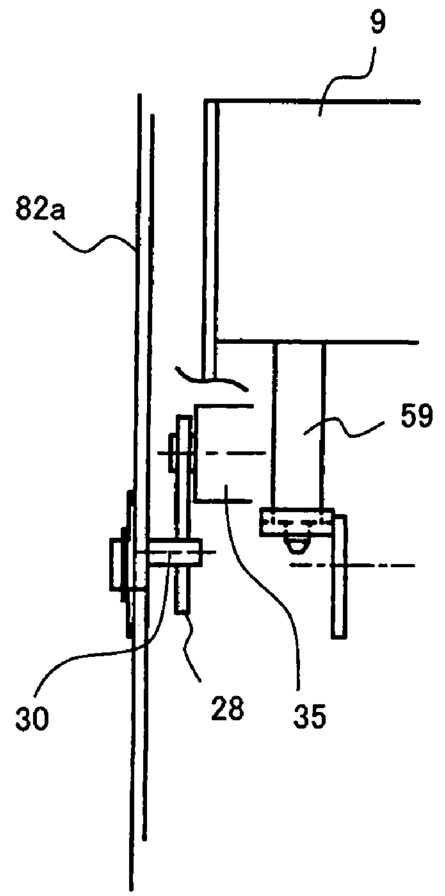
FIG. 17D is an explanatory view of the configuration of attaching a belt contact roller.

FIG. 17A shows a state in which the conveying mechanism 1 (1B) is attached into the holes 83*a* and 83*b* provided in the side plates 82*a* and 82*b* of the apparatus frame 80. FIG. 17B is a sectional view from the recording medium supply side near the resist roller pair 7. FIG. 17C shows a configuration of the roller rotation shaft and the end of the second resist roller. FIG. 17D is an explanatory view of the configuration of attaching a belt contact roller.

The first resist rollers 7*a* (7*a*-1 through 7*a*-4) are incorporated or fixed into the roller rotation shaft 2*b* as the center of the rotation of the driven roller 2. Thus, the roller rotation shaft 2*b* and the first resist roller 7*a* rotate in a unit. Furthermore, the roller rotation shaft 2*b* is provided with the conveying belt driven rollers 2*a*-1 through 2*a*-3 that can rotate on the roller rotation shaft 2*b* through the bearing 2*c*. The roller rotation shaft 2*b* penetrates the extended arm 9*a* and is supported by the extended arm 9*a* extended from the head holder 9 such that it can be substantially parallel to the nozzle string direction of the recording head 10.

Both ends of the roller rotation shaft 2*b* are supported by the apparatus frame 80 through the bearing unit 22 such as bearing etc. provided for the holes 83*a* and 83*b* in the side plates 82*a* and 82*b* such that they can rotate.

The both ends of the second resist roller 7*b* is attached to and supported by a bearing unit 24 for rotation. The bearing unit 24 is engaged in a groove 25*a* of a bracket 25 supported by the roller rotation shaft 2*b*.

The bracket 25 on the front side and the bracket 25 on the rear side (the bracket 25 on the rear side is shown in FIG. 17A) are fixed to the side plates 82*a* and 82*b* of the apparatus frame 80 such that the roller rotation shaft 2*b* can be parallel to the rotation shaft of the second resist roller 7*b*.

There is a spring 26 between the bearing unit 24 and the groove 25*a* of the bracket 25. Thus, the second resist roller 7*b* contacts the first resist roller 7*a* at appropriate pressure.

On the other hand, the belt contact roller 35 is attached to a bracket 28. Practically, the belt contact roller 35 is attached for rotation at one end of the bracket 28. The other end of the bracket 28 is supported by the roller rotation shaft 2*b*. The same configuration is designed for the bracket 28 provided on the rear side not shown in the attached drawings.

One end portion of a spring 29 is applied to the bracket 28. The other end of the spring 29 is applied to the platen frame 32 (similarly on the rear side). Therefore, by the urging force of the spring 29, the belt contact roller 35 contacts the conveying belt 5. A stopper 30 is provided for the side plates 82*a* and 82*b*.

Described below are the processing operations of the image recording apparatus with the above-mentioned configuration according to the present mode for embodying the present invention.

When an image is recorded on the recording medium in the image recording apparatus, record data is input through an interface not shown in the attached drawings. When the record data is input, the control unit 18 performs the following processes.

Figure 14:
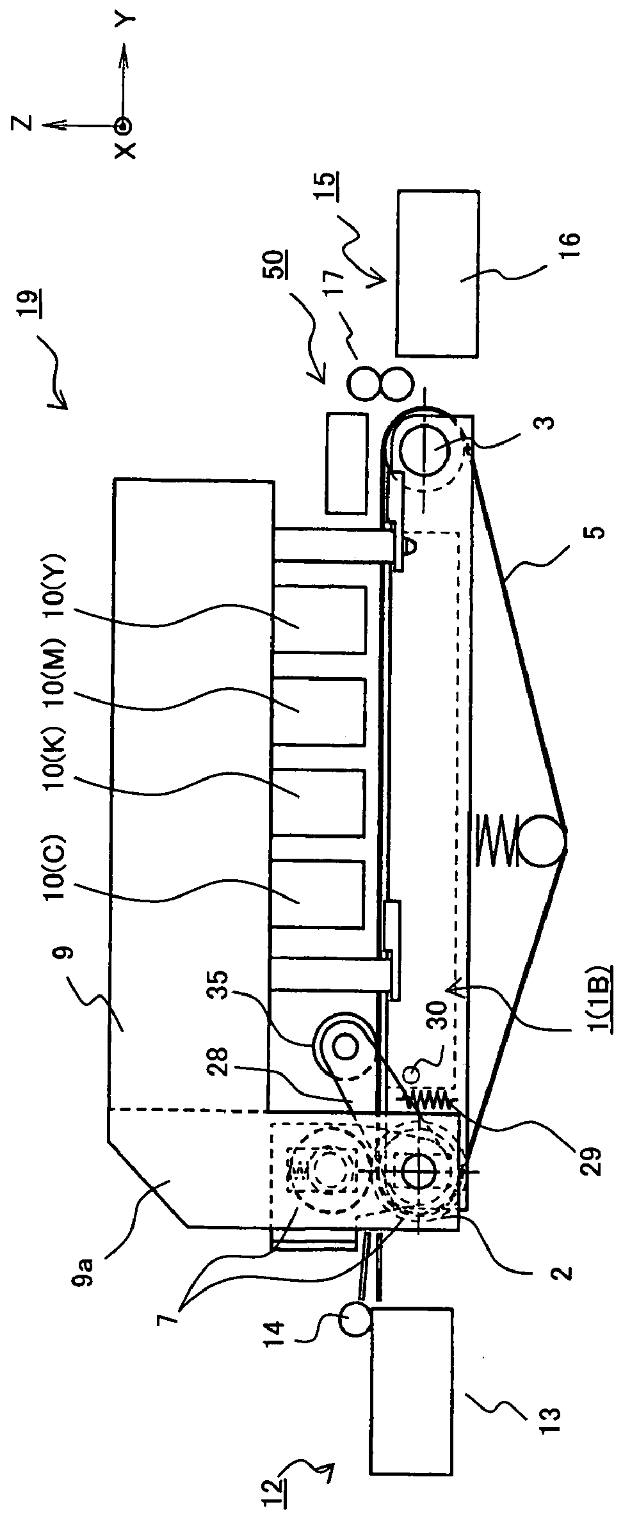
FIG. 14 is an explanatory view showing the outline of the entire image recording apparatus according to the mode 4 for embodying the present invention.

First, the control unit 18 confirms whether or not the maintenance unit 50 is set in the home position shown in FIG. 14, and moves the contact block 58 of the conveying mechanism 1 (1B) to the position corresponding to the recording medium 20 to be printed. Next, the up-and-down mechanism not shown in the attached drawings is driven, and the conveying mechanism 1 (1B) is lifted with the roller rotation shaft 2*b* centered. At this time, the touch pin 59 provided for the head holder 9 is engaged in each contact block 58 of the conveying mechanism 1 (1B), and the conveying mechanism 1 (1B) and the image recording unit 8 are positioned. In this state, the up-and-down mechanism further lifts the conveying mechanism 1 (1B), and stops the lifting when the head holder 9 is separate from the support member 82*e* provided for the apparatus frame 80. That is, when the image recording unit 8 is completely placed and held by the conveying mechanism 1 (1B), the lifting operation stops. At this time, the conveying mechanism 1 (1B) and the head holder 9 are positioned on the basis of the roller rotation shaft 2*b* supported by the extended arm 9*a* extended from the head holder 9. Therefore, although the apparatus frame 80 is deformed by the disturbance etc. applied to the apparatus frame 80, the relative positions of the conveying mechanism 1 (1B) and the head holder 9 are not changed. Therefore, the resist roller pair 7 corrects the skew, and the conveying direction of the recording medium 20 conveyed by the conveying belt 5 to the image recording unit 8 is orthogonal to the nozzle string direction of the recording head 10.

Next, the control unit 18 transmits a drive instruction to a drive force transmitting system, drives for rotation the pickup roller 14, picks up the recording medium 20 from the supply tray 13, and conveys the medium in the conveying direction to the resist roller pair 7. The conveying direction of the recording medium 20 conveyed to the resist roller pair 7 is corrected and then the recording medium 20 is conveyed to the image recording unit 8 by the drive of the resist roller pair 7. Then, the image recording unit 8 performs a printing process according to the record data, and the recording medium 20 is ejected to the paper eject tray 16 by the eject roller pair 17.

After the image recording process terminates, when the maintaining operation is started, or a paper jam occurs, the conveying mechanism 1 (1B) is saved from the image recording unit 8. In this case, the up-and-down mechanism not shown in the attached drawings saves below the conveying mechanism 1 (1B) with the roller rotation shaft 2*b* centered.

Figure 18:
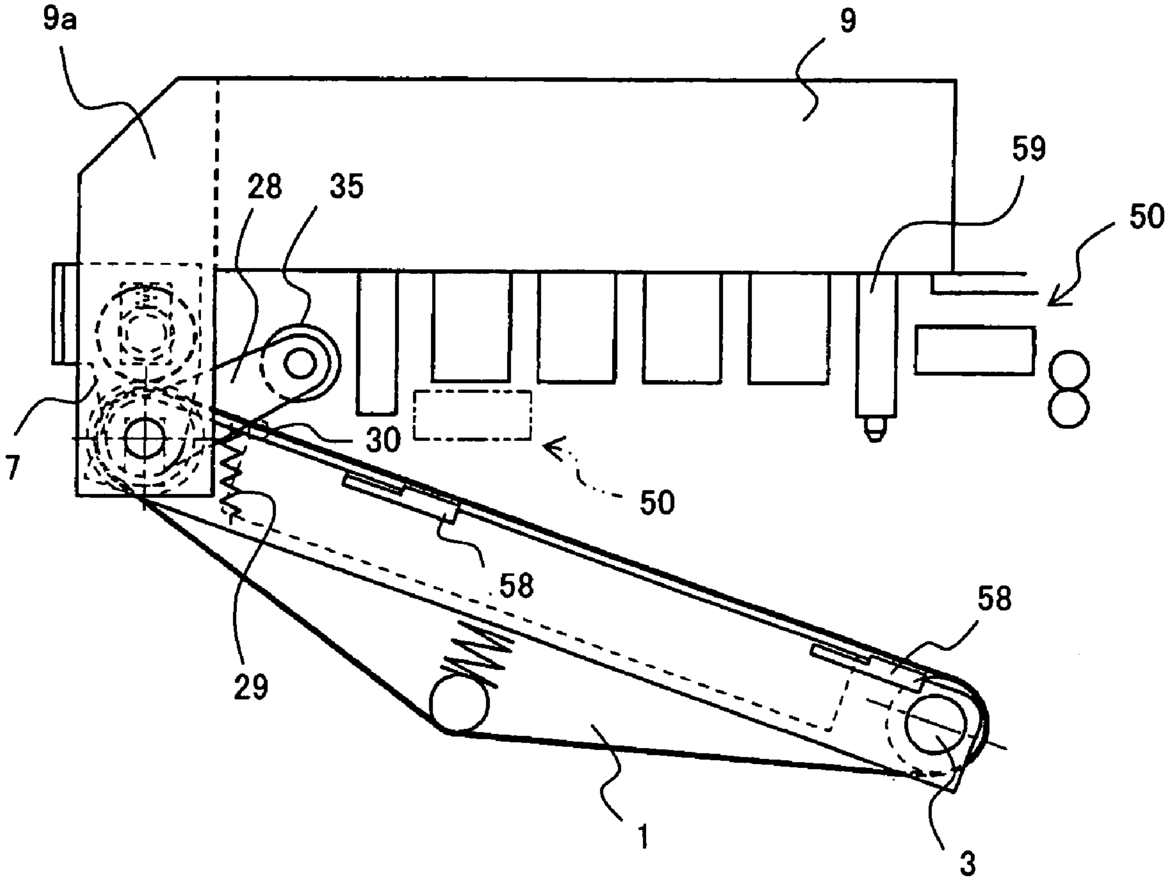
FIG. 18 shows a state in which the conveying mechanism is saved.

FIG. 18 shows a state in which the conveying mechanism 1 (1B) is saved. In this state, for example, a process of removing the recording medium 20 jammed in the apparatus is performed. Furthermore, the recording head 10 is maintained using the maintenance unit 50. In FIG. 18, only one maintenance unit 50 is shown, but the maintenance unit 50 can be provided for the recording head 10 of each color.

In this state, the belt contact roller 35 is pulled downward by the spring 29 applied on the platen frame 32, but can be held at a predetermined position by the stopper 30 provided for the side plates 82*a* and 82*b* of the apparatus frame 80 contacting the bracket 28. With the configuration, although a paper jam occurs around the belt contact roller 35, the contact of the belt contact roller 35 with the conveying belt 5 is released, thereby easily removing the jammed paper.

As described above, according to the present mode for embodying the invention, both the image recording unit 8 for printing data onto the recording medium 20 and the conveying mechanism 1 (1B) for conveying the recording medium 20 are positioned by the resist roller pair 7, the printing accuracy can be improved, and a high-quality image recording apparatus that constantly performs stable color combination can be realized. In addition, according to the image recording apparatus of the present mode for embodying the invention, a maintaining operation such as a jam processing operation can be easily performed. In the present mode, the conveying mechanism 1 (1B) is saved below, but the head holder 9 can be saved upward.

Next, an example of a variation according to the mode 4 for embodying the present invention is described below with reference to FIG. 19.

Figure 19A:
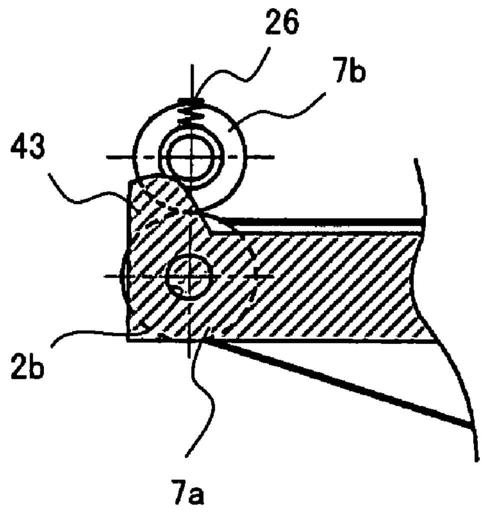
FIG. 19 is an explanatory view of an example of a variation according to the mode 4 for embodying the present invention.
Figure 19B:
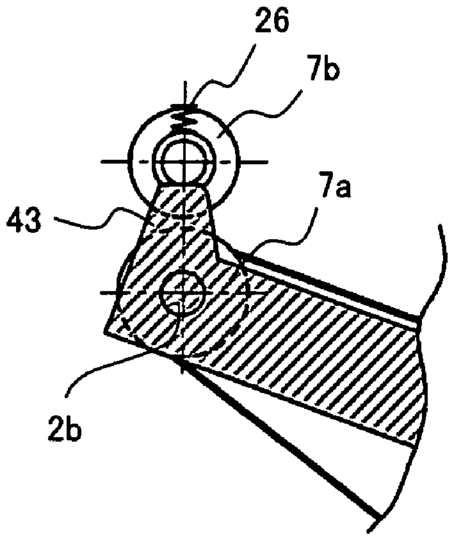

FIGS. 19A and 19B show the configuration around the end portion of the platen frame 32 on the paper feed side. As with the mode 4 for embodying the present invention described above, the first resist roller 7*a* and the second resist roller 7*b* are pressed to each other by the spring 26.

The platen frame 32 of the present variation example is provided with an engagement unit 43 like an upward projection as the end portion. With the configuration, when the conveying mechanism 1 (1B) is in the image recording state as shown in FIG. 19A, both rollers are contacted with pressure. Although when the conveying mechanism 1 (1B) is moved to a saving position, the second resist roller 7*b* is lifted as shown in FIG. 19B. That is, the engagement unit 43 contacts the bearing unit 24, moves up the second resist roller 7*b* against the urging force of the spring 26, and forms a predetermined space between the first resist roller 7*a* and the second resist roller 7*b*.

Therefore, a process of removing the recording medium 20 as a jam around the resist roller pair 7 can be easily performed.

The conveying mechanism of the image recording apparatus according to the present invention is not limited to each of the above-mentioned modes for embodying the present invention, but the components can be appropriately varied and combined within the scope of the disclosed gist of the present invention.

For example, the resist roller drive unit 33 of the conveying mechanisms 1A and 1B according to the modes 1 and 2 for embodying the present invention can be replaced with the configuration in which, as the conveying mechanism 1C according to the mode 3 for embodying the present invention, the belt drive pulley 36 is provided for the driving roller 3 and the roller drive pulley 38 is provided for the driven roller 2 for replacement with the transmission belt transmission belt 37, the first switch clutch 39, an the second switch clutch 40. In addition, the variation example of the mode 1 for embodying the present invention can be applied to the modes 1, 2, and 3 for embodying the present invention.

Furthermore, at a request, some components can be deleted in embodying the present invention. For example, the conveying mechanism of each mode for embodying the present invention can obtain a similar effect by deleting the belt contact roller 35 and enhancing the suction force of the suction fan 41 instead of forming the upward expanded loop of the recording medium 20.

What is claimed is:

1. An image recording apparatus, comprising:

an image recording unit which records an image on a recording medium, and a conveying mechanism which conveys the recording medium, wherein the conveying mechanism comprises:

a first belt roller;

a second belt roller provided substantially parallel to the first belt roller downstream in the conveying direction of the recording medium;

a conveying belt looped over at least the first belt roller and the second belt roller;

a belt drive unit which conveys the conveying belt;

a resist roller pair comprising a first resist roller and a second resist roller contacting the first resist roller; and a resist roller drive unit which drives the rotation of the first resist roller or the second resist roller, wherein the first belt roller and the first resist roller are coaxially arranged, and the first belt roller rotates independently of the first resist roller, and wherein a diameter of the first resist roller is larger than a diameter of the first belt roller.

2. The apparatus according to claim 1, wherein the resist roller drive unit also functions as the belt drive unit.

3. The apparatus according to claim 1, comprising a plurality of the first resist rollers and the first belt rollers.

4. The apparatus according to claim 1, wherein an amount of travel per unit time of the recording medium by the resist roller pair is larger than an amount of travel per unit time of the recording medium by the conveying belt.

5. The apparatus according to claim 1, further comprising a belt contact roller, provided between the first belt roller and the second belt roller in a conveying direction of the recording medium, for contacting the conveying belt.

6. The apparatus according to claim 1, wherein a rotation axis of the first belt roller coincides with a rotation axis of the first resist roller.

7. An image recording apparatus, comprising:

an image recording unit which records an image on a recording medium, and a conveying mechanism which conveys the recording medium, wherein the conveying mechanism comprises:

a first belt roller;

a second belt roller provided substantially parallel to the first belt roller downstream in the conveying direction of the recording medium;

a conveying belt looped over at least the first belt roller and the second belt roller;

a belt drive unit which conveys the conveying belt;

a resist roller pair comprising a first resist roller and a second resist roller contacting the first resist roller; and a resist roller drive unit which drives the rotation of the first resist roller or the second resist roller, wherein the first belt roller and the first resist roller are coaxially arranged, and the first belt roller rotates independently of the first resist roller, and wherein an amount of travel per unit time of the recording medium by the resist roller pair is larger than an amount of travel per unit time of the recording medium by the conveying belt.

8. The apparatus according to claim 7, wherein the resist roller drive unit also functions as the belt drive unit.

9. The apparatus according to claim 7, wherein a diameter of the first resist roller is larger than a diameter of the first belt roller.

10. The apparatus according to claim 7, comprising a plurality of the first resist rollers and the first belt rollers.

11. The apparatus according to claim 7, further comprising a belt contact roller, provided between the first belt roller and the second belt roller in a conveying direction of the recording medium, for contacting the conveying belt.

12. The apparatus according to claim 7, wherein a rotation axis of the first belt roller coincides with a rotation axis of the first resist roller.

13. The image recording apparatus according to claim 7, further comprising:

a moving mechanism which moves the conveying mechanism to a recording position at which the conveying mechanism faces the image recording unit and to a removed position at which the conveying mechanism is removed from the image recording unit, wherein a contact pressure of the second resist roller contacting the first resist roller is released by the conveying mechanism being moved to the removed position by the moving mechanism.

* * * * *